United States Patent [19]

Neufeld

[11] 4,403,146

[45] Sep. 6, 1983

[54] EVALUATION OF THE INTERACTION WITH RADIANT ENERGY OF SUBSTANCES TRAVERSED BY A BORE HOLE

[75] Inventor: Jacob Neufeld, Oak Ridge, Tenn.

[73] Assignee: Halliburton Company, Duncan, Okla.

[21] Appl. No.: 301,653

[22] Filed: Sep. 14, 1981

Related U.S. Application Data

[62] Division of Ser. No. 149,276, May 12, 1980, Pat. No. 4,326,129.

[51] Int. Cl.$^3$ ............................................. G01V 5/00
[52] U.S. Cl. ................................... 250/262; 250/269
[58] Field of Search ............... 250/261, 262, 269, 270; 364/422

[56] References Cited

U.S. PATENT DOCUMENTS 3,379,882  4/1968  Youmans ........................ 250/270 X
3,509,346  4/1970  Mills, Jr. et al. .................... 250/262
3,662,179  5/1972  Frentrop et al. ............... 250/269 X Primary Examiner—Davis L. Willis
Attorney, Agent, or Firm—William J. Beard

[57] ABSTRACT

Disclosed is a well logging method and apparatus for obtaining impulse response of a formation traversed by a bore hole by means of correlation techniques. Use is made of a source of radiant energy and of a control element for said source to produce a substantially random or pseudorandom sequence of discrete bursts of radiant energy from the source to cause interactions of these bursts with the formation whereby characteristic radiations of interactions are produced. A detector is provided which is responsive to these radiations to produce corresponding signals. In one embodiment of my invention the impulse response, expressed by a function $h(t)$, is obtained by crosscorrelating signals produced by the detector with signals representing the bursts of radiant energy from the source. In another embodiment the impulse response $h(t)$ of the formation is obtained by autocorrelating signals produced by the detector. In another embodiment of my invention the outputs of two detectors, differently spaced from a source of radiant energy, are crosscorrelated. Using the function $h(t)$, valuable information regarding physical properties of the formation may be obtained. The source of radiant energy may be a source of energetic neutrons, particularly of the deuterium-tritium type, or a source of gamma radiation or of microwaves, or a source of any other form of radiant energy.

2 Claims, 16 Drawing Figures

EVALUATION OF THE INTERACTION WITH RADIANT ENERGY OF SUBSTANCES TRAVERSED BY A BORE HOLE

This is a divisional application of pending prior application Ser. No. 06/149,276 filed May 12, 1980 now U.S. Pat. No. 4,326,129 for Evaluation of the Interaction with Radiant Energy of Substances Traversed by a Bore Hole.

BACKGROUND OF THE INVENTION

This invention relates to well logging methods and apparatus for investigating characteristics of an earth formation traversed by a bore hole and of substances within the bore hole and is based upon physical measurements, such as electrical, acoustical, nuclear or other measurements. The objective of the invention is to express the properties of a substance or of earth formation in terms of an "impulse response function," $h(t)$, which represents the response of the substance or of the earth formation to a burst of energy of a short duration. The energy may be electrical, acoustical, or it may be expressed by a pulse of neutrons or by any radiation pulse. The function $h(t)$ is dependent upon certain significant properties of the substance or of the formation. From the function $h(t)$ one can determine these properties and thus valuable information may be obtained.

In an idealized representation, which may be used in mathematical derivations, an impulse response function $h(t)$ may be approximated by a function known as Green's function. The burst of energy which generates the function $h(t)$ would then be expressed in an idealized form by a "unit impulse" which is a rectangular pulse obtained by keeping the area of the pulse to be equal to unity and allowing the width of the pulse to become infinitisimal, thus causing the height of the pulse to approach infinity. The unit impulse will then be expressed by a function known as the Dirac delta function, $\delta(t)$, which is specified by the conditions:

$$\delta(t) = 0 \text{ for } t \neq 0 \quad (1)$$

and $$\int_{-\epsilon}^{\epsilon} \delta(t) dt = 1 \text{ for all } \epsilon > 0 \quad (2)$$

where t represents time.

Broadly speaking the impulse response function $h(t)$ describes physical behavior of a material substance or a medium if an "impulse field" were suddenly applied to such a substance or medium. In practical situations the impulse field is represented by an energy burst of a relatively short duration. The impulse field interacts with a substance or a medium and radiations are produced as a result of such interactions.

The intensity of these radiations as they vary with time will then be expressed by the function $h(t)$. The impulse field may be associated with any form of energy or any form of a physical field, such as an electrical field, a radiation field, an acoustic field, a field represented by an assembly or flow of particles which may interact or diffuse through a medium; such as a stream of fast neutrons or photons, a cloud of thermal neutrons, etc. The impulse response function $h(t)$ may be defined as "associated" with:

(1) a particular type of the field (or with a particular type of radiant energy represented by the field) and with (2) a particular response of a material medium or of a substance interacting with the field or with a particular radiation which represents this response.

As an example, it can be said that the impulse response function $h(t)$ is "associated" with neutrons representing an applied field, and at the same time it may be associated with gamma rays representing the response of a medium to the applied field. The neutrons may have a specified energy or a specified energy spectrum. To be specific, an impulse response function, $h(t)$, may be associated with 14 MeV neutrons and gamma rays having energies from 3.43 MeV to 10 Mev.

Many efforts have been made in the past to develop successfully methods and apparatus for obtaining impulse response functions of formations traversed by a bore hole. These methods and apparatus of the prior art were applied mainly to nuclear and acoustical well logging. Procedures used in nuclear logging were described, for instance, in U.S. Pat. No. 3,379,882 issued to A. H. Youmans on Apr. 23, 1968; in U.S. Pat. No. 3,509,346 issued to W. R. Mills, Jr., et al. on Apr. 28, 1970; in the U.S. Pat. No. 3,662,179 issued to A. H. Frentrop et al. on May 9, 1972 and in numerous other patents. It has been customary in the prior art to irradiate formations with discrete bursts of high energy neutrons usually obtained by means of generators of the deuterium-tritium type. Each burst produced in the formations traversed by a bore hole and within the fluid in the bore hole a population or a cloud of thermal neutrons which rapidly increased, attained a maximum and then slowly decayed with time. Radiation detectors were used for directly measuring the intensity of such a cloud, during an appropriate time interval following a neutron burst. The function which described the variation in intensity of a cloud was termed "neutron decay function." The term "impulse response function" introduced in this specification has a meaning which is broader than that of the "neutron decay function" and it is used in nuclear well logging as well as in other forms of well logging.

In the measurements of the prior art, the time intervals separating successive neutron bursts had to be relatively large so as to allow the neutron decay function to die out before the succeeding neutron burst began. The disadvantages of this technique were principally in their low efficiency, as the pulsed neutron source was utilized during a relatively small fraction of time. In well logging used for oil exploration, each burst of fast neutrons lasted typically 30 microseconds and the time intervals separating the bursts were approximately 2000 microseconds. Thus the pulses were produced at a repetition rate of 500 pulses per second. Consequently, the utilization factor of the source was of the order of 1.5%.

A very low utilization factor of the radiation source was also encountered in uranium exploration and, particularly in uranium exploration by means of delayed fission logging as disclosed in U.S. Pat. No. 3,686,503 issued to W. W. Givens et al. on Aug. 22, 1972. It is well known by those skilled in the art, that earth formations may be characterized with regard to their uranium content on the basis of delayed neutrons resulting from neutron fission of uranium. When a formation containing a uranium ore is irradiated with neutrons, the uranium nuclei react to neutron bombardment by breaking into smaller nuclear fractions which are normally referred to as fission products. The fission of uranium is attended by the emission of prompt neutrons immediately upon occurrence of the fission reaction and also by the emission of delayed neutrons subsequent to the fission process. The delayed neutrons are emitted by the fission products for an appreciable length of time following the fission reaction and the most abundant delayed neutron group exhibits the half life of about 2.3 seconds. Givens et al. pointed out, in the aforementioned U.S. Pat. No. 3,686,503 that the source of fast neutrons should be operated, approximately, at two bursts per second, each burst having a duration of about three microseconds. Consequently, the utilization factor of the neutron source was only 0.0015%.

Numerous efforts have also been made to obtain impulse response functions in acoustical logging as suggested in U.S. Pat. No. 3,962,674 issued to E. P. Howell on June 8, 1976 and in other patents. It was customary in acoustical logging to employ downhole sonde which contained a generator of acoustic energy pulse and a detector for receiving pulses from the environment adjacent to the sonde. The generator transmitted, repetitively, at relatively large intervals of time, short acoustic energy bursts to the environment adjacent to the sonde. The detector received several acoustic pulses produced by each burst and a recorder connected to the detector made a record of the arrivals and shapes of the detected pulses. Such a record was a record of an "impulse response function" defined in this specification. When an acoustic energy burst is transmitted from the sonde to the surrounding environment it follows a number of paths of differing nature in order to get to the detector. Some of these paths are through the casing, and cement behind the casing. Others are through solid particles of sand and rock. Others are through solids and partially through interstitial fluids or through the interconnected fluid-filled pore spaces alone. Knowing the impulse response function, various individual pulses produced by each burst may be identified. Knowing the distance between the generator and the detector, the velocities of these pulses and, consequently, the properties of the formations, may be determined by measuring the time of travel between the generator and the detector. It was necessary in the procedures of the prior art to have the time intervals between the acoustic energy bursts produced by the generator to be relatively large. Each succeeding burst should have been produced after a time interval that has allowed all individual pulses produced by a burst to arrive at the detector. The disadvantages were similar to those encountered in nuclear well logging. The generator was utilized at a relatively small fraction of time.

E. B. Blankov and Iu. V. Kormiltsev have recently described in USSR Pat. No. 407,260, issued on Nov. 21, 1973, a different method for obtaining an impulse response function in nuclear well logging. This method was based on correlations. According to the disclosure in that patent, the impulse response function h(t) was obtained by crosscorrelating fluctuations in the output of an isotopic neutron source, such as a Po-Be source with fluctuations in the output of a radiation detector placed at an appropriate distance from the source. The disadvantage of this method was in its low efficiency. Because of a relatively low intensity of commercially available isotopic neutron sources, it would have required a long time to perform a crosscorrelation measurement at each depth of the bore hole. This by itself would make it difficult to apply the method in commercial operations.

Measurements of neutron decay times in the prior art were based on an assumption that the population of thermal neutrons in the fluid within the bore hole dies away substantially faster than in the formations surrounding the bore hole. It was well understood by those skilled in the art that, generally, measurements representing the formations were more desirable than those which represented the fluid. Accordingly, the decay constant associated with the slower decay time (or slower neutron lifetime) was measured. A record was made of the impulse response function of the type $$h(t) = Me^{-\gamma t} \qquad (3)$$

where M and $\gamma$ are constants. The decay constant $\gamma$ can be expressed as $\gamma = v\Sigma$ where $v = 2.2 \cdot 10^5$ cm/sec is the velocity of thermal neutrons and $\Sigma$ is the macroscopic cross section for capture of thermal neutrons of the medium in which the slowing down process occurred. The quantity $\Sigma$ was interpreted as representing the macroscopic cross section for capture of thermal neutrons in the formations surrounding the bore hole.

However, the expression of the equation (3) did not always give sufficiently useful information. The information was useful when drilling fluids in the bore hole, having high chlorine content (and correspondingly fast decay time) were encountered. However, the information was not sufficiently useful when the bore hole contained air, gas, fresh water or oil. In such cases, the procedures of the prior art could not have been used.

In nuclear well logging as in other nuclear measurement techniques the problems dealing with the background noise were encountered and efforts were made to improve the signal to noise ratio in these mesurements. These efforts were not entirely successful.

SUMMARY OF THE INVENTION

The purpose of my invention is to provide an impulse response function h(t) by using a procedure in which a more efficient utilization of a radiation source is made.

Another purpose of my invention is to provide a method and apparatus for logging bore holes containing air, gas, fresh water or oil.

Another purpose of my invention is to apply correlation techniques for improving signal to noise ratio in measurements made in well logging.

One of the main features of my invention is in producing within a bore hole a substantially random or pseudorandom sequence of intense energy bursts. These bursts may be nuclear, acoustical, electrical or any other type of energy bursts. A detector is provided at an appropriate distance from the source for detecting radiations which are produced by the interactions of these energy bursts with the formations traversed by the bore hole and with the fluid within the bore hole. An impulse response function h(t) characterizing the medium adjacent to the detector is obtained by applying correlation techniques. In one embodiment of my invention a correlator is used for autocorrelating the output signals from the detector. In another embodiment of my invention a correlator is used for crosscorrelating the output signals from the detector with the signals representing energy pulses obtained from the source.

Using the techniques based on my invention a 50% utilization factor of the radiation source may be obtained. In the standard well logging techniques in petroleum industry, as practiced in the prior art, the utilization factor was only of the order of 1.5%, and it was only of the order of 0.0015% in nuclear techniques applied to uranium exploration.

Because of the intensity of the neutron bursts generated by the available sources of the deuterium-tritium type, I have been able to improve the statistics in the radiation-matter interactions and to perform correlation measurements in relatively short time intervals, considerably shorter than the time intervals that could be involved in the method suggested by E. B. Blankov and Iu. V. Kormiltsev in the above cited USSR patent.

I have also provided in my invention a computing means and method for analyzing the structure of the impulse response function, h(t), without restricting myself to any particular conditions which may be encountered in logging a bore hole as it was the case in the prior art. It should be recalled that the procedures used in the prior art could not have been applied when the bore hole contained air, gas, fresh water or oil. In order to broaden the applicability of impulse response techniques, I do not restrict myself to the formulation expressed by the equation (3). Namely, I express the decaying portion of the impulse response function h(t) as a sum of two component functions exponentially decaying at different rates. These component functions are individually associated with the thermal neutron slowing down processes in the formations surrounding the bore hole and in the fluid within the bore hole. In my formulation the impulse response function is $$h(t) = Ae^{-\alpha t} + Be^{-\beta t} \tag{4}$$

where A, B, $\alpha$ and $\beta$ are constants; $Ae^{-\alpha t}$ is the neutron population of the formation component; $Be^{-\beta t}$ is the neutron population of the fluid component in the bore hole, and the constants $\alpha$ and $\beta$ are thermal neutron decay constants of the earth formation and of the fluid in the bore hole, respectively. The two decay constants $\alpha$ and $\beta$ can be expressed as $\alpha = v\Sigma_1$ and $\beta = v\Sigma_2$, respectively, where $v = 2.2 \times 10^5$ cm/sec is the velocity of thermal neutrons, $\Sigma_1$ is the macroscopic cross section for capture of thermal neutrons in the formation, and $\Sigma_2$ is the macroscopic cross section for capture of thermal neutrons in the bore hole. When the logging is made of a bore hole containing air, gas, fresh water or oil the decay constant $\alpha$ is larger than the decay constant $\beta$, and, conversely, the decay constant $\alpha$ is smaller than the decay constant $\beta$ when the fluid in the bore hole contains salt. By separately evaluating the two components in the equation (4), I made it possible for my invention to be practiced when the methods of the prior art could not be applied.

The invention will be best understood by reference to the following detailed description thereof when taken in conjunction with the corresponding drawings in which:

DETAILED DESCRIPTION OF THE INVENTION

Broadly speaking my invention is based on the use of correlators and on correlation. A correlator produces output signals which give a dependence between the values of data represented by the input signals. If the data are represented by a single function the dependence is expressed by autocorrelation. Autocorrelation describes a general dependence of the values of the data at one time on the values at another time. If the data are represented by two functions, the dependence is expressed by crosscorrelation. Cross-correlation describes the dependence of the values of the data represented by one function at one time on the values represented by another function at another time.

Figure 1:
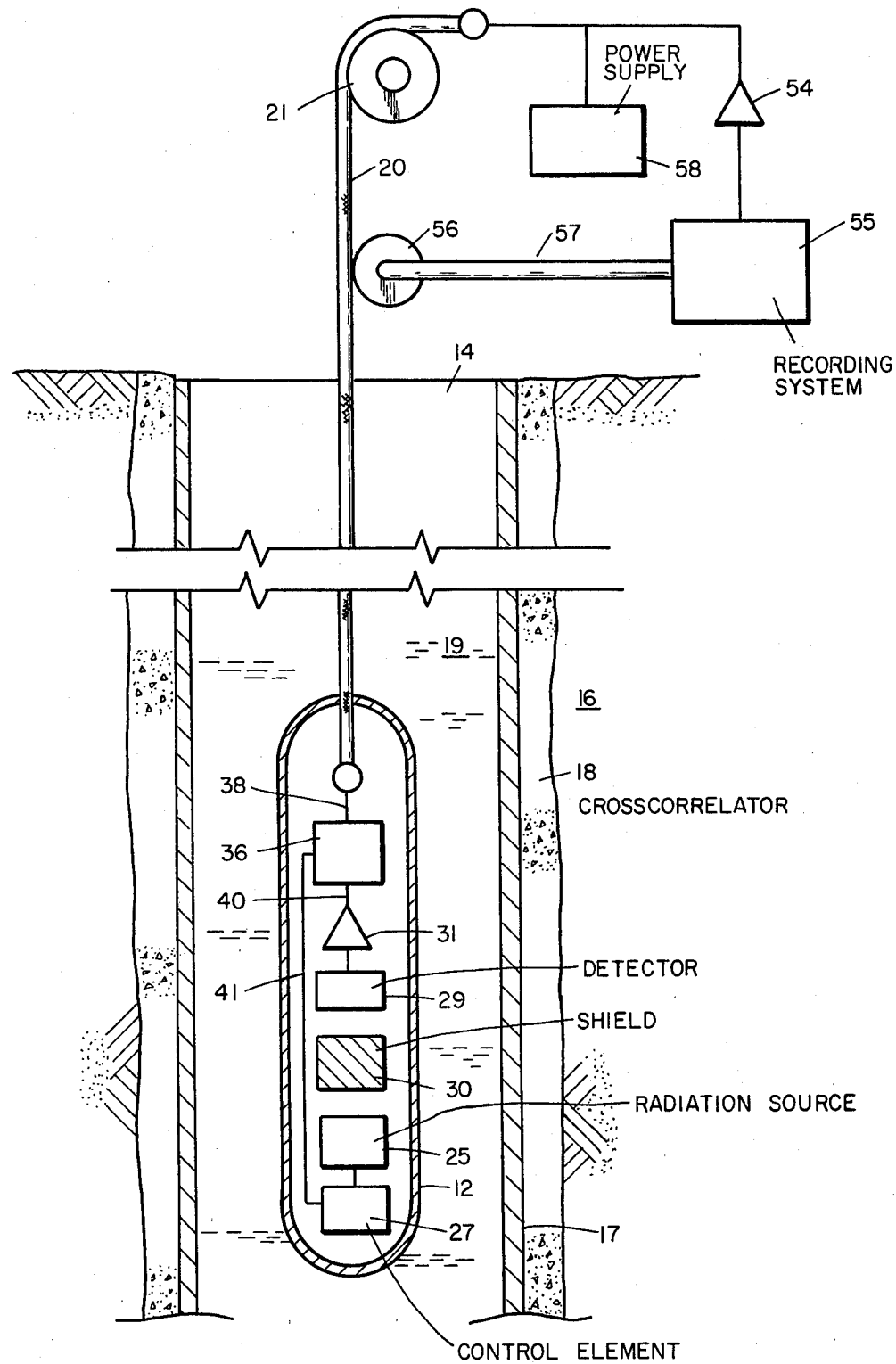
FIG. 1 is a drawing which illustrates a well logging system comprising a pulse generator, a detector and a crosscorrelator for correlating the output of the generator with the output of the detector in accordance with my invention.

The well logging systems shown in FIG. 1, which is based on crosscorrelation, includes a fluid tight housing 12 adapted to be suspended in a bore hole 14 that traverses earth formations 16. The bore hole may be either cased, as represented by casing 17 and cement annulus 18, or uncased, and it may be filled with a drilling mud 19 or other fluid. Suspension and vertical movement of the housing 12 is controlled by an armored cable 20 which extends to the earth's surface and passes over a winch 21. The cable 20 may have one or more conductors for transmitting electrical signals from the instruments within the housing 12 to the earth's surface.

A source 25 of radiant energy and a control element 27 are provided within the housing 12. The control element 27 is adapted to control the source 25 to produce repetitively a substantially random or pseudorandom sequence of discrete bursts of radiant energy from said source to cause interactions of said bursts of radiant energy with the earth formations 16 and with the fluid 19, whereby characteristic radiations of said interactions are produced. The control element 27 is a random or pseudorandom signal generator of a type well known in the art. Random or pseudorandom signal generators have been described by G. C. Anderson, B. W. Finnie and G. T. Roberts, *Hewlett-Packard Journal,* 19, No. 1, 2-17, 1967, and by others. In a strict mathematical sense, the probability distribution of signals generated by the control element 27 is non-Gaussian in nature, but it closely approximates a Gaussian distribution. In other words, it approximates white noise. Thus the distribution has a frequency spectrum which is substantially flat over the band width of the system under consideration. The pseudorandom signal generator may be of the type described in U.S. Pat. No. 2,671,896 issued to L. A. de Rosa on Mar. 9, 1954 or of the type described in U.S. Pat. No. 3,581,191 issued to W. A. Anderson on May 25, 1971. These two patents are specifically incorporated in this specification as references.

The source 25 may be a source of fast neutrons or of gamma radiations, or of microwaves, or it may be a source of acoustical energy, or a source of any other form of energy. Accordingly, the bursts of radiant energy may be bursts of fast neutrons, of gamma radiation, of microwaves, of acoustical energy, or of any other form of energy.

Spaced at a predetermined distance from the source 25 along the longitudinal axis of the bore hole there is provided within the housing 12 a detector 29. The detector 29 is responsive to the characteristic radiations resulting from the interactions of the energy bursts produced by the source 25 with the environment adjacent to the housing 12 and is adapted to produce electrical signals corresponding to these interactions. A suitable shield 30 is preferably interposed between the radiation source 25 and the detector 29 to attenuate radiations between the source and the detector.

The output of the detector 29 is applied through an amplifier 31 to a correlator. A correlator is capable of performing crosscorrelation or autocorrelation. The correlator in FIG. 1 is a crosscorrelator and is identified therein as crosscorrelator 36. At the output leads 38 of the crosscorrelator 36 a signal is obtained which represents crosscorrelation of two input signals. One of these signals applied to the input lead 40 is derived from the amplifier 31 and it represents the output of the detector 29. The other signal applied to the input lead 41 is derived from the control element 27 and it represents a succession of energy pulses produced by the source 25. A correlator which is adapted both for crosscorrelation and autocorrelation and which can be used in the embodiment of FIG. 1 and in other embodiments described in this specification may be of the type described in U.S. Pat. No. 2,643,819 issued to Yuk Wing Lee and also in U.S. Pat. No. 2,676,206 issued to W. R. Bennett, et al. These two patents are specifically incorporated in this specification as references. A correlator type known as Model 3721A is manufactured by Hewlett Packard Company of Palo Alto, Calif.

The signal derived from the crosscorrelator 36 is transmitted by means of the cable 20 to the earth's surface and subsequently applied through an amplifier 54 to a recording system 55. The recording system 55 is operated in correlation with the depth of the housing 12 by a measuring wheel 56 and connector 57. A surface power supply 58 provides operative power for the down hole system via the conductors of the well logging cable 20.

In explaining the operation of my invention, the function representing energy pulses produced by the source 25 will be expressed as x(t) and the function representing the output of the detector 29 will be expressed as y(t). Crosscorrelation of the functions x(t) and y(t) is defined as:

$$R_{xy}(\tau) = \overline{x(t)y(t+\tau)} = \lim_{T\to\infty} \frac{1}{2T} \int_{-T}^{T} x(t)y(t+\tau)dt \quad (5)$$

and auto correlation of the function x(t) is defined as $$R_{xx}(\tau) = \overline{x(t)x(t+\tau)} = \lim_{T\to\infty} \frac{1}{2T} \int_{-T}^{T} x(t)x(t+\tau)dt \quad (6)$$

where T is the time of measurement and the bar above equations (5) and (6) denotes an averaging process.

The impulse response function h(t) is related to the expression $R_{xy}(t)$ in the equation (5) and to the expression $R_{xx}(t)$ in the equation (6) by the following equality $$R_{xy}(\tau) = \int_{-\infty}^{\infty} h(\lambda)R_{xx}(\tau-\lambda)d\lambda \quad (7)$$

The equality (7) can be found, for instance, in a publication by P. R. Roth on "Effective Measurements using Digital Signal Analysis," *IEEE Spectrum,* 8, No. 4, 62-70, 1971 (see page 68, equation (22) therein) or in a book by Y. W. Lee on *Statistical Theory of Communication,* John Wiley and Son, New York, N.Y., 1960 (see page 341, equation (87) therein).

Equality (7) takes a particularly simple form when x(t) is white noise or a random or pseudorandom function which approximates white noise. In such case the autocorrelation function can be expressed as $$R_{xx}(\tau) = C\delta(\tau) \quad (8)$$

where $\delta(\tau)$ is a Dirac delta function of the variable $\tau$ and C is a constant. The relationship (8) when substituted in the equation (7) gives $$R_{xy}(\tau) = Ch(\tau) \quad (9)$$

Thus, as shown by the equation (9), the crosscorrelation signal $R_{xy}(\tau)$ obtained at the output terminal 38 of the crosscorrelator 36 represents the impulse response function h(t).

To illustrate my invention I chose the radiant energy source 25 to be a generator of fast neutrons. Such a neutron generator would be preferably of the deuterium-tritium type as known in the art. This type of neutron source accelerates deuterium ions into a target material which is impregnated with tritium. The deuterium ions are supplied from a replenisher which comprises a material impregnated with deuterium which is boiled off by heating. The deuterium atoms thus provided are then supplied to an ion source comprising a region of the tube in which electric fields are provided to ionize the atomic deuterium from the replenisher and to focus the positive ions into a beam suitable for acceleration onto the target material. The target material is generally kept at a high negative potential.

A source of this type is manufactured by Kaman Nuclear of Colorado Springs, Colo. Arrangements for controlling the source 25 so as to produce neutron pulses in response to a succession of signals or pulses produced by the control element 27 are well known in the art. Such arrangements have been described in U.S. Pat. No. 3,686,503 issued to W. W. Givens, et al. on Aug. 22, 1972; in the U.S. Pat. No. 3,662,179 issued to H. H. Frentrop, et al. on May 9, 1972; in U.S. Pat. No. 4,002,904 issued to H. D. Smith, et al., on Jan. 11, 1977; and in U.S. Pat. No. 3,739,171 issued to H. D. Scott on June 12, 1973. These patents are specifically incorporated in this specification as references.

In some instances the ion source is provided with an electrode structure analogous to that of a conventional triode vacuum tube and having an element analogous to the control grid of such a tube. By applying a time-varying voltage to this control grid element, the resultant intensity of neutron output of the accelerator tube may be modulated as a function of time. A more detailed description of the methods and means employed to produce an intensity modulated fast neutron flux, can be found in a publication entitled: "The Generation of Neutron Pulses and Modulated Neutron Fluxes with Sealed-off Neutron Tubes" by C. W. Elenga and O. Reifenschweiler, published in the *Proceedings of the Symposium on Pulsed Neutron Research*, Vol. II, pages 609–622, International Atomic Energy Agency of Vienna, Austria, 1965.

The neutron source 25 may comprise a belt driven electrostatic generator such as the well known Van de Graaf high voltage generator. In such case the arrangement for controlling the source 25 so as to provide neutron pulses in response to a succession of signals or pulses produced by the element 27 may be of the type described in U.S. Pat. No. 3,886,355 issued to R. B. Culver on May 27, 1975; in U.S. Pat. No. 3,309,522 issued to A. H. Youmans, et al. on Mar. 14, 1967; and in U.S. Pat. No. 3,305,684 issued to E. C. Hopkinson, et al. on Feb. 21, 1967. These patents are specifically incorporated in this specification as references.

In making a neutron log, the housing 12 is caused to traverse the bore hole. Thus discrete bursts or pulses of high energy neutrons emitted by the source 25 bombard the earth formation and the fluid in the bore hole. For each fast neutron pulsse, a cloud of fast neutrons is injected in a generally symmetric fashion about the source to the environment surrounding the housing 12. The fast neutron cloud passes from the housing through the fluid 19 in the well, bore hole casing 17, cement 18, and through earth formation 16 surrounding the bore hole. The fast neutrons are rapidly slowed down and produce a thermal neutron population which is represented by a thermal neutron cloud in the environment adjacent to the housing 12. The density of thermal neutrons rapidly rises and then decays due to the capture of thermalized neutrons by the formation and bore hole elemental nuclei. This rapid rise and subsequent relatively slow decay of the density of the thermal neutron cloud is expressed by the impulse response function h(t). The capture of thermal neutrons by the nuclei of elements in the formations and in the bore hole causes these nuclei to emit thermal neutron capture gamma rays. Therefore, the detector 29 could be either a thermal neutron detector or a gamma ray detector. If a thermal detector is used, then the thermal neutrons are detected directly. If a gamma ray detector is used, then gamma rays resulting from the capture of gamma rays are detected. This provides an indirect but proportional measurement of the number of thermal neutrons present. A gamma ray detector may be of a type which comprises a scintillator in the form of an optically transparent thallium activated crystal of sodium iodide or the like with an end window photomultiplier tube optically coupled to the crystal. A thermal neutron detector may be, for instance, a helium-3 proportional counter of the type described in U.S. Pat. No. 3,102,198 issued to T. W. Bonner on Aug. 27, 1963. The shield 30 separating the neutron source 25 from the detector 29 may be of a suitable composition such as a combination of lead, polystyrene, lucite plastic or other high hydrogen content material or the like.

Signals produced by the detector are transmitted through the amplifier 31 to the crosscorrelator 36 which is also connected to the control element 27 to receive signals representing the neutron bursts emitted by the source 25. The crosscorrelated signal obtained from the crosscorrelator 36 represents the impulse response function, h(t), as it was shown by means of the equations (5) to (9). This signal is transmitted to the earth's surface for recording in the recording system 55.

Figure 2:
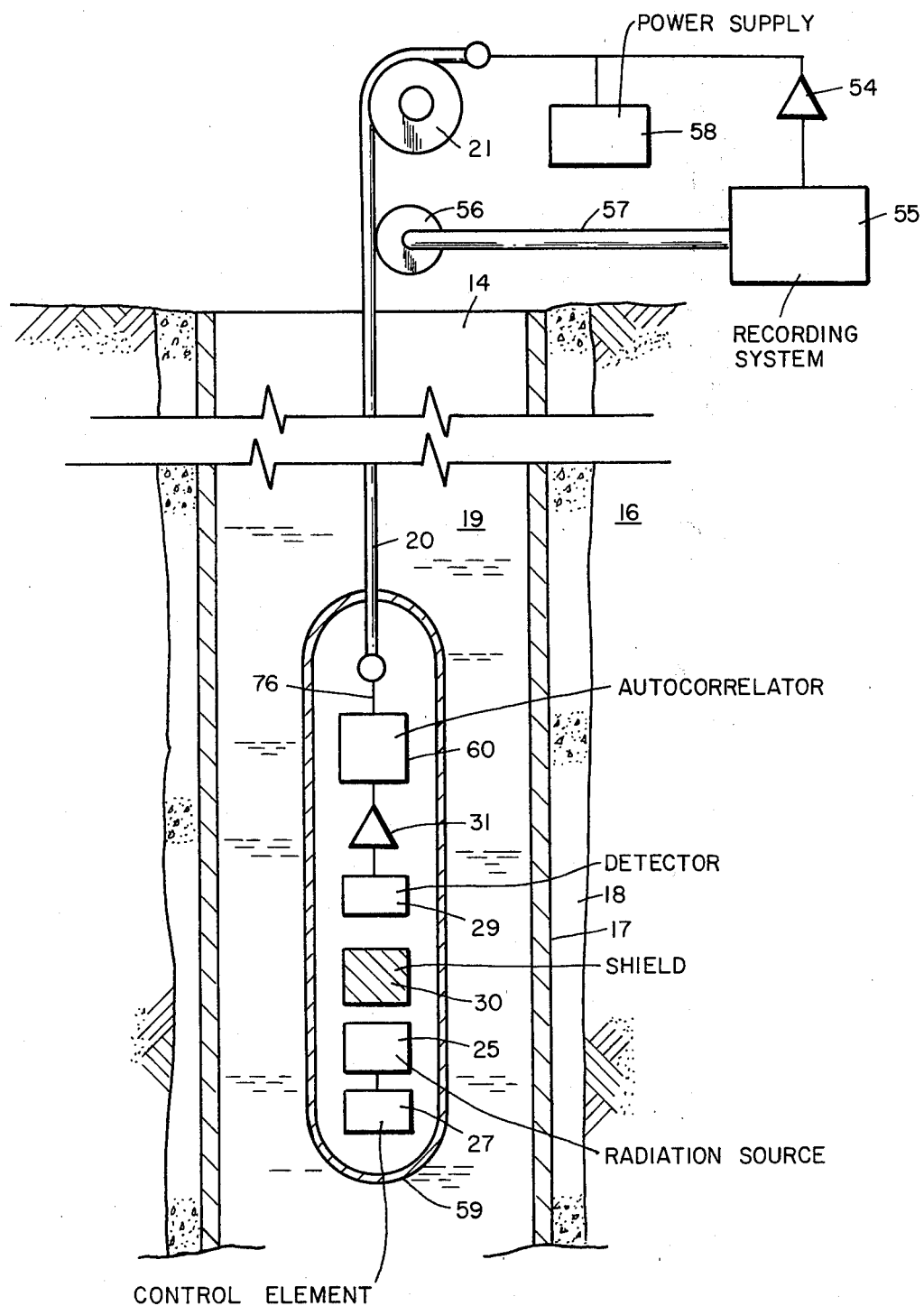
FIG. 2 is a drawing showing an embodiment of my invention which comprises an autocorrelator for autocorrelating the output signals of a detector.

An impulse response function h(t) can also be obtained by means of a different arrangement shown in FIG. 2. The well logging system shown in FIG. 2 includes a source of radiant energy in combination with a detector and a correlator. The source, the detector and the correlator are contained within a housing 59 which is adapted to be lowered to various depths in a bore hole. The source may be a source of fast neutrons, or of gamma radiations, of microwaves, or it may be a source of acoustical energy, or a source of any other form of energy. Within the embodiment shown in FIG. 2, components similar to those included in the embodiment of FIG. 1 have identical reference numerals and their descriptions and functions will not be restated except insofar as it is necessary to explain the operation of the embodiment of FIG. 2.

The correlator in FIG. 2 is adapted for autocorrelating signals derived from the detector 29 and amplified in the amplifier 31. Therefore, this correlator is identified in FIG. 2 as autocorrelator 60. The output of the autocorrelator 60 is transmitted by means of the cable 20 to the surface of the earth where it passes through an amplifier 54 to a recording system 55.

The method of operation of the system shown in FIG. 2 is based on a relationship which follows.

$$R_{yy}(\tau) = \int_{-\infty}^{\infty} R_{hh}(\lambda) R_{xx}(\tau - \lambda) d\lambda \tag{10}$$

where $R_{yy}(\tau)$ is the autocorrelation signal produced by the autocorrelator 60. $R_{xx}(\tau)$ is as defined in the expression of the equation (6), and $$R_{hh}(\lambda) = \overline{h(t)h(t + \lambda)} = \lim_{T \to \infty} \frac{1}{2T} \int_{-T}^{T} h(t)h(t + \lambda)dt \quad (11)$$

(The relationship (10) can be found for instance in a book by Y. W. Lee on *Statistical Theory of Communication*, John Wiley and Son, New York, N.Y. 1960, as a relationship (45) on page 335 therein.)

When the input expressed by the function x(t) can be approximated by white noise, the relationship (1) is $$R_{yy}(\tau) = NR_{hh}(\tau) \quad (12)$$

where N is a constant. Substituting h(t) as expressed by the relationship of equation (3) in equation (11), and then substituting the equation (11) in the equation (12), one obtains $$R_{yy}(t) = \frac{NM^2}{2\gamma} e^{-\gamma t} \quad (13)$$

The relationship of equation (13) shows that the function $R_{yy}(t)$, which is the autocorrelation function obtained from the output terminals 76 of the autocorrelator 60, represents the impulse response function h(t).

The arrangement shown in FIG. 2 can also be used when an isotopic neutron source such as a polonium-beryllium source is employed. Then, in FIG. 2 the generator 25 and the control element 27 should be replaced by such an isotopic neutron source. Neutrons emitted by such a source are distributed in time in accordance with Poisson statistics. The neutron radiation can, therefore, be approximated by white noise. By applying reasoning similar to that above, and based on equations (10) to (13) on can show that the autocorrelation function derived from the autocorrelator 60 would provide the impulse response function h(t).

Figure 3:
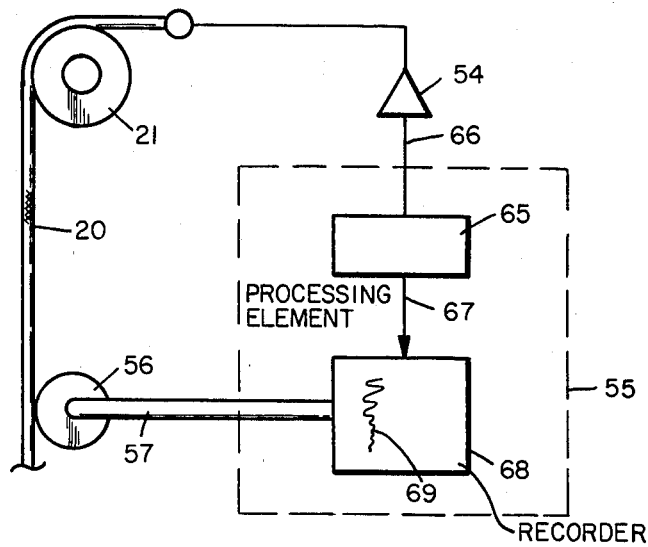
FIG. 3 is a drawing showing schematically a recording system for analyzing and recording well logging data when the impulse response function, h(t), is expressed by a single exponentially decaying quantity.
Figure 4:
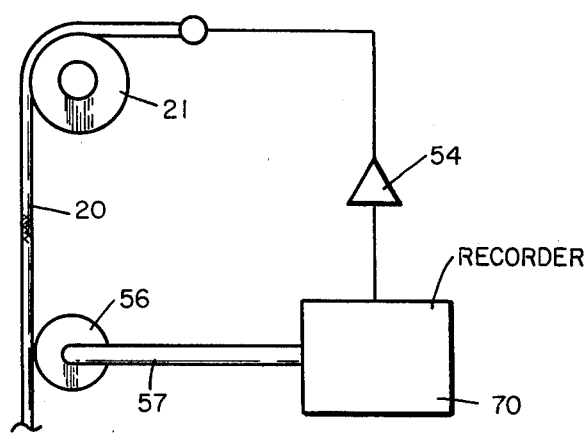
FIG. 4 is a drawing showing a portion of the well logging system in which the impulse response function, h(t), is recorded on a magnetic tape.
Figure 5:
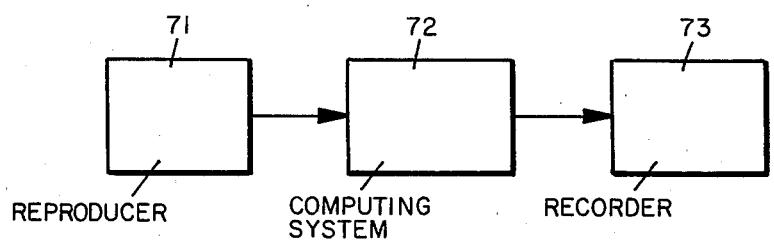
FIG. 5 is a drawing showing schematically an analyzing and recording system which is based on the least-squares analysis.
Figure 6A:
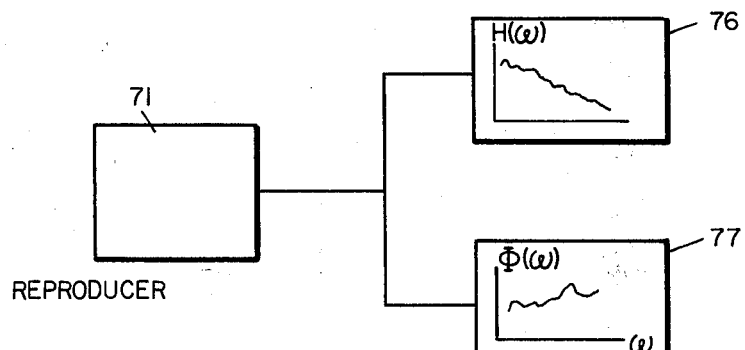
FIG. 6a is a drawing showing a first type of an analyzing and recording system which is based on Fourier transformations.
Figure 6B:
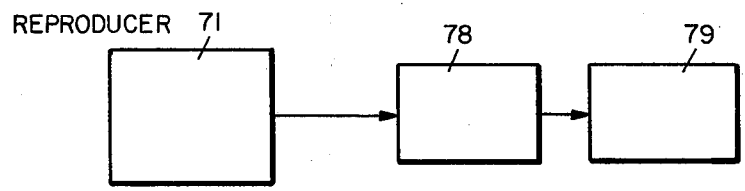
FIG. 6b is a drawing showing a modified embodiment of FIG. 6a which comprises a computer means.
Figure 7A:
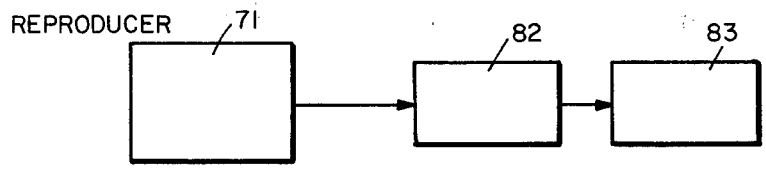
FIG. 7a is a drawing showing a second type of analyzing and recording system which is based on Fourier transformations.
Figure 7B:
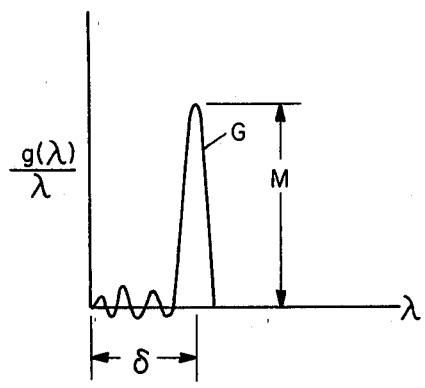
FIG. 7b is a drawing showing a record obtained by the recording system of FIG. 7a when the impulse response function, h(t), consists of a single exponentially decaying function.
Figure 7C:
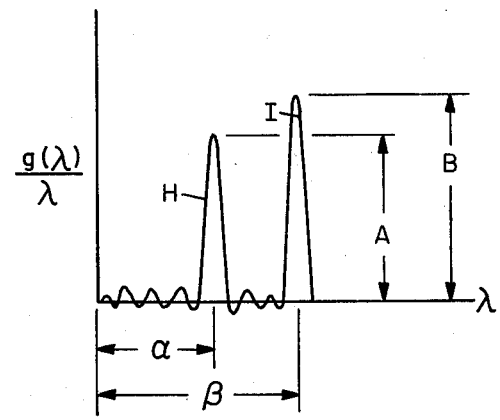
FIG. 7c is a drawing showing a record obtained by the recording system of FIG. 7a when the impulse response function, h(t), is expressed by two exponentially decaying component functions.

Analyzing and recording systems for analyzing and recording the impulse response function h(t) are shown in FIGS. 3, 4, 5, 6a, 6b, and in FIGS. 7a, 7b and 7c. FIG. 3 shows a recording system for well logging when the drilling fluid in the bore hole has a high salt content, i.e., when the decaying portion of the impulse response function h(t) is expressed by a single exponential term as shown by the expression of the equation (3). FIGS. 4, 5, 6a, 6b, 7a, 7b and 7c describe analyzing and recording systems of a more general applicability than that of FIG. 3. Their use is not restricted to the analysis an impulse response function h(t), as expressed by the expression of the equation (3) as it can also be employed for analyzing an impulse response function, h(t), which comprises two exponential terms as shown by the expression of the equation (4).

The recording system of FIG. 3 is shown comprising a processing element 65 having its input lead 66 connected to the amplifier 54 and its output lead 67 connected to a recorder 68. The processing element 65 may be of any type appropriate for the deviation of the decay constant γ from an exponential function such as that shown in the expression of the equation (3). Processing elements of such type have been described in U.S. Pat. No. 3,413,473 issued to W. R. Mills, Jr. on Nov. 26, 1968; in U.S. Pat. No. 3,930,154 issued to H. D. Scott on Dec. 30, 1975; in U.S. Pat. No. 3,373,280 issued to W. R. Mills, Jr. on Mar. 12, 1968; in U.S. Pat. No. 3,800,150 issued to W. W. Givens on Mar. 26, 1974; in U.S. Pat. No. 4,002,903 issued to R. W. Pitts, Jr., et al. on Jan. 11, 1977; in U.S. Pat. No. 4,041,309 issued to E. C. Hopkinson on Aug. 9, 1977; and in U.S. Pat. No. 4,046,764 issued to G. L. Marquis on Sept. 6, 1977. These patents are specifically incorporated in this specification as references. The recorder 68 is driven in correlation with depth by a measuring wheel 56 and connector 57. One obtains on the chart of the recorder 68 a trace 69 showing the decay constant γ as it varies with depth.

It is well understood by those skilled in the art that magnetic recording can also be used for recording the impulse response function h(t). In the arrangement shown in FIG. 4 the output of the amplifier 54 is applied to a tape recorder 70 and is stored therein on a magnetic tape as a function of bore hole depth. The tape recorder 70 is driven in correlation with depth by a measuring wheel 56 and connector 57.

The magnetic record of the impulse response function, h(t), obtained by means of the recorder 70 is subsequently reproduced in the system of FIG. 5 which may be at a location remote from the bore hole. A magnetic tape reproducer 71 in FIG. 5 supplies the function h(t) to a computing system 72. Within the computing system 72 operations are performed for obtaining the values of M and γ if the function h(t) is expressed by the equation (3) or for obtaining the values of A, B, α and β if the function h(t) is expressed by the equation (4). These values are subsequently fed to a recorder 73 wherein they are recorded as a function of depth.

Within the computing system 72 operations are performed based on the least-squares analysis as described in a publication by J. B. Cumming on "CLSQ, the Brookhaven Decay Curve Analysis Program" in *Applications of Computers to Nuclear and Radiochemistry, Proceedings of a Symposium*, Gatlinburg, Tennessee, Oct. 17–19, 1962, pages 25–33, U.S. Atomic Energy Commission Report NAS-NS 3107, Chemistry.

Some of the fundamental aspects of the least square analysis as applied here will be briefly outlined.

The data on the curve representing the impulse response function h(t) consists of n measurements $h_i$ performed at times $t_i$. Operations which are performed within the computing system 72 are based on m independent standard exponentially decaying component functions.

The set of data expressed by $h_i$ satisfies n equations of the form $$h_i = \sum_{j=1}^{m} x_j e^{-\lambda_j t_i} + v_i \quad (14)$$

where an individual term in the sum, $x_j e^{-\lambda_j t_i}$ represents the contribution of the j-th exponentially decaying component to the total sum at time $t_i$. The residual, $v_i$, at that point represents an error. Since the m coefficients $x_j$ enter these equations linearly, a solution by the least square method is possible. The condition for such a solution is $$\sum_{i=1}^{n} p_i v_i^2 = \text{minimum} \quad (15)$$

where $p_i$ is the weight assigned to the square of each residual.

In matrix notation equations (14) and (15) become $$F_{n1} = A_{nm} X_{m1} + V_{n1} \qquad (16)$$

and $$V_{n1}' P_{nn} V_{n1} = \text{minimum} \qquad (17)$$

In equations (16) and (17) the subscripts indicate dimensions (rows and columns respectively) of the matrices. The symbol $V_{n1}'$ represents the transpose of matrix $V_{n1}$. The least-squares solution for the matrix of the unknown coefficients, $X_{m1}$ is given by $$A_{nm}' P_{nn} F_{n1} = A_{nm}' P_{nn} A_{nm} X_{m1}. \qquad (18)$$

To solve this equation for $X_{m1}$, one defines'

$$B_{mm} = A_{nm}' P_{nn} A_{nm}. \qquad (19)$$

The $B_{mm}$ matrix is inverted to obtain $B_{mm}^{-1}$ and the solution for the unknown coefficient matrix is given by $$X_{m1} = B_{mm}^{-1} A_{nm}' P_{nn} F_{n1}. \qquad (20)$$

The variance of the i-th coefficient is obtained from the corresponding diagonal element of $B_{mm}^{-1}$, $$\sigma_{x_i}^2 = (B_{mm}^{-1})_{ii}. \qquad (21)$$

The decay constants, $\lambda$, do not enter linearly in equation (14); hence, a least-squares solution for their best values is not possible. However, if the terms are expanded in terms of small changes, $\delta x_j$ and $\delta \lambda_j$ from a set of initial guesses $x_j^0$ and $\lambda_j^0$ as shown below $$(x_j^0 + \delta x_j) e^{-(\lambda_j^0 + \delta \lambda_j) t_i}$$
$$\approx (x_j^0 + \delta x_j) e^{-\lambda_j^0 t_i}$$
$$- x_j^0 \delta \lambda_j t_i e^{-\lambda_j^0 t_i}, \qquad (22)$$

a solution for the $\delta \lambda$ terms is now possible. An iterative procedure may then be used as shown in the above referred to publication by J. B. Cumming, until any degree of convergence is attained. A decay curve analysis program has been coded for operation on an IBM computer under control of the FORTRAN monitor system. For an organizational diagram and for a detailed description of the main program and of various subroutines see the aforementioned paper by J. B. Cumming.

A different instrumental means for analyzing the impulse response function h(t) is shown in FIGS. 6a and 6b. In both figures the impulse response function h(t) previously recorded on a magnetic tape is obtained from the magnetic tape reproducer 71. This function varies with time. However, in this arrangement the impulse response function will be expressed in frequency domain as $$H(\omega) = \int_{-\infty}^{\infty} h(t) e^{-i\omega t} dt. \qquad (23)$$

The function $H(\omega)$ is a complex quantity which may be written as $$H(\omega) = |H(\omega)| e^{-i\Phi(\omega)} \qquad (24)$$

where $\omega$ is frequency, $|H(\omega)|$ is the gain factor and $\Phi(\omega)$ is the phase factor. Both $|H(\omega)|$ and $\Phi(\omega)$ can be obtained instrumentally by Fourier analyzing the function h(t). In FIG. 6a the data representing the function h(t) obtained by means of the magnetic reproducer 71 are fed to two frequency analyzers represented schematically by blocks 76 and 77. The amplitude frequency analyzer 76 provides the amplitude frequency spectrum $|H(\omega)|$ whereas the phase frequency analyzer 77 provides the phase frequency spectrum $\Phi(\omega)$. Both $|H(\omega)|$ and $\Phi(\omega)$ have a direct physical significance as follows. Assume a system, i.e., the earth formation, is subjected to a sinusoidal input with a frequency $\omega$, producing an output which also is sinusoidal with the same frequency. The ratio of the output amplitude to the input amplitude may be conviently thought in terms of the gain factor $|H(\omega)|$, and the phase shift between the output and the input can be conveniently thought in terms of the phase factor $\Phi(\omega)$.

The procedure for expressing the impulse response function in frequency domain provides a valuable tool for analyzing physical properties of formations traversed by a bore hole. Various data of practical significance may be obtained. Thus by analyzing the impulse response function in frequency domain, the earth formation thermal neutron decay constant $\alpha$ and the bore hole thermal neutron decay constant $\beta$, as they appear in the expression of the equation (4), may be determined. The appropriate procedure has been described in U.S. Pat. No. 3,930,152 issued to R. W. Pitts on Dec. 30, 1975 and in U.S. Pat. No. 3,940,611 issued to D. M. Arnold on Feb. 29, 1976. These patents are specifically incorporated in this specification as references. There is a relationship which is identified as equation (6) in the specifications of these patents. This relationship is $$R \left( \frac{\alpha^2 + \omega^2}{\beta^2 + \omega^2} \right) = \frac{1 + \alpha X}{1 + \beta X} \qquad (25)$$

where $$R = \frac{B}{A} \text{ and } X = \frac{\tan \Phi(\omega)}{\omega}. \qquad (26)$$

The relationship expressed by the equation (25) contains three unknown quantities which are $\alpha$, $\beta$, and R. The quantity $\alpha$ is the most desirable. It is an indication of the formation thermal neutron decay time, which, is very important in determining the possible hydrocarbon content and water saturation of earth formation in the vicinity of a well bore.

Since equation (25) contains three unknowns, R, $\alpha$, and $\beta$, at least three independent equations are needed to determine these three unknowns. The three independent equations for determining the three unknowns, R, $\alpha$, and $\beta$ may be obtained by determining the values of the function $\Phi(\omega)$, recorded in the phase frequency analyzer 77 for three different frequencies, $\omega_1$, $\omega_2$, and $\omega_3$. It has been shown in the aforementioned U.S. Pat. Nos. 3,930,152 and 3,940,611 that from the three equations thus obtained the following two relationships can be derived $$a_3 \alpha^3 + a_2 \alpha^2 + a_1 \alpha + a_0 = 0 \qquad (27)$$

and $$c_3 \beta^3 + c_2 \beta^2 + c_1 \beta + c_0 = 0 \qquad (28)$$

where $a_i$ (i=1, 2 and 3) are known functions of $X_1$, $X_2$, $\omega_1$ and $\omega_2$ and $c_i$ (i=1, 2 and 3) are known functions of $\alpha$, $X_1$, $X_3$, $\omega_1$ and $\omega_3$, $X_1=[\tan \Phi(\omega_1)]/\omega_1$, $X_2=[\tan \Phi(\omega_2)]/\omega_2$ and $X_3=[\tan \Phi(\omega_3)]/\omega_3$. Equations (27) and (28) represent two independent equations with $\beta$ and $\alpha$ as the unknowns. Graphical techniques have been described in the aforementioned U.S. Pat. Nos. 3,930,152 and 3,940,611 for solving equations (27) and (28) whereby numerical values of $\alpha$ and $\beta$ can be obtained. The three different frequencies which have been selected are $f_1=\omega_1/2\pi=400$ Hertz, $f_2=\omega_2/2\pi=2000$ Hertz and $f_3=\omega_3/2\pi=4000$ Hertz.

It is well understood by those skilled in the art that a properly programmed digital computer rather than the graphical approach can be used for solving the equations (27) and (28). A system based on a digital computer has been described in the above referred to U.S. Pat. Nos. 3,930,152 and 3,940,611. In FIG. 6b data representing the function h(t) obtained from the magnetic reproducer 71 are applied to a computer 78. Within the computer 78 operations are performed for obtaining the quantities $\alpha$ and $\beta$ as explained in the aforementioned U.S. Pat. Nos. 3,930,152 and 3,940,611. These quantities are then recorded as function of depth in the recorder 79.

A different instrumental arrangement for analyzing the impulse response function h(t) is shown in FIGS. 7a, 7b and 7c. A magnetic tape reproducer 71 supplies the function h(t) to a computing system 82 which provides information recorded in the recorder 83. Computations performed within the computing system 82 have been described in a publication by D. G. Gardner and J. C. Gardner on "Analysis of Multicomponent Decay Curves by Use of Fourier Transforms" in *Applications of Computers to Nuclear and Radiochemistry, Proceedings of a Symposium, Gatlinburg, Tennessee*, Oct. 17–19, 1962, pages 33–40, U.S. Atomic Energy Commission Report NAS-NS3107, Chemistry.

The operation of the computing system as described by D. J. Gardner and J. C. Gardner is based on a representation of the impulse response function h(t) in the form of a Laplace transform $$h(t) = \sum_{j=1}^{m} x_j e^{-\lambda_j t} = \int_{-\infty}^{\infty} g(\lambda) e^{-\lambda t} d\lambda \quad (29)$$

Here $g(\lambda)$ is a sum of Dirac delta functions. Due to the error inherent in the experimental estimate of the impulse response function h(t) and in the numerical computations necessary to obtain $g(\lambda)$, a plot of $g(\lambda)$ versus $\lambda$ will appear in the form of a frequency spectrum. Thus a function $g(\lambda)/\lambda$ is obtained by means of the computing system 82 and is visually recorded on a chart of the recorder 83. FIGS. 7b and 7c show two different graphs which may be obtained. These graphs show spectral representations of the quantity $g(\lambda)/\lambda$ (which is an ordinate) as a function of the quantity $\lambda$ (which is an abscissa). A single component impulse response function h(t) such as that expressed by the equation (3) is analyzed by means of the plot shown in FIG. 7b. A two component impulse response function h(t) such as that expressed by the equation (4) is analyzed by means of a plot shown in FIG. 7c. In FIG. 7b the presence of a peak G in the spectrum indicates the parameters in the equation (3). The height of the peak is the quantity M whereas the abscissa at the center of the peak is the decay constant $\gamma$. In FIG. 7c the presence of two peaks, H and I, indicates the two components shown in the equation (4). The height of the peak H is the quantity A whereas the abscissa in the center of the peak H is the decay constant $\alpha$. Similarly, the height of the peak I is the quantity B whereas the abscissa at the center of the peak I is the decay constant $\beta$. The ripples in FIGS. 7b and 7c indicate errors which are relatively small.

The function $g(\lambda)/\lambda$ as plotted in FIGS. 7b or 7c is obtained as follows. The variables $\lambda$ and t in the equation (29) are transformed to give $\lambda=e^{-y}$ and $t=e^x$. Then $$h(e^x) = \int_{-\infty}^{\infty} \exp[-e^{(x-y)}] g(e^{-y}) e^{-y} dy. \quad (30)$$

If one defines $F(\mu)$ as the Fourier transform of $e^x f(e^x)$, one obtains $$F(\mu)=(2\pi)^{\frac{1}{2}} G(\mu) K(\mu) \quad (31)$$

$$g(\mu)=[1/(2\pi)^{\frac{1}{2}}][F(\mu)/K(\mu)]. \quad (32)$$

Here $G(\mu)$ is the Fourier transform of $g(e^{-y})$, and $K(\mu)$ is the Euler integral for the complex Gamma function, $$K(\mu)=[1/(2\pi)^{\frac{1}{2}}]\Gamma(1+i\mu). \quad (33)$$

To obtain $g(e^{-y})$ one takes the inverse Fourier transform of $G(\mu)$, $$g(e^{-y}) = \frac{1}{2\pi} \int_{-\infty}^{\infty} \frac{F(\mu)}{K(\mu)} e^{-iy\mu} d\mu. \quad (34)$$

Since $$g(e^{-y}) dy = [g(\lambda)/\lambda] d\lambda, \quad (35)$$

a plot of $g(e^{-y})$ versus y is equivalent to a plot of $g(\lambda)/\lambda$ versus $\lambda$ which is recorded on the chart of the recorder 83 in FIG. 7a.

The above method of solution involves essentially only two integrations. First $F(\mu)$ is found by using equation (34). For a detailed description on how the above method is applied to various cases (including two components and four component curves) see the aforementioned paper by D. G. Gardner and J. Gardner.

Figure 8:
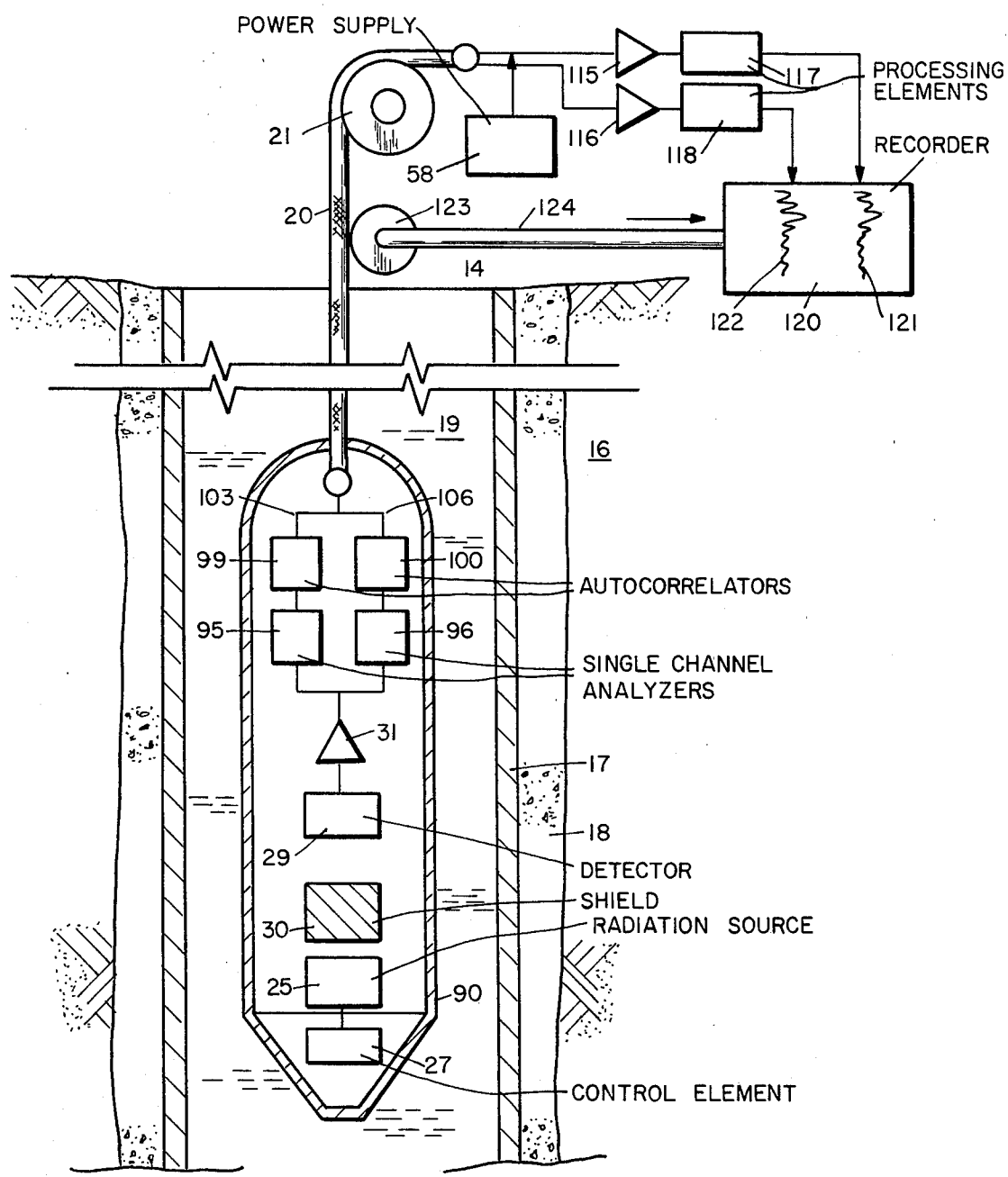
FIG. 8 is a drawing showing an embodiment of my invention comprising two single channel analyzers for selectively receiving gamma rays prior to correlation.

Another embodiment of my invention is shown in FIG. 8. Within the arrangement shown in FIG. 8, components similar to those included in the embodiment of FIG. 1 have identical reference numerals and their descriptions and functions will not be restated except insofar as it is necessary to explain the operation of the embodiment of FIG. 8. The detector 29 in FIG. 8 is a gamma ray detector which is applied through amplifier 31 to a first single channel analyzer 95 and to a second single channel analyzer 96. The first single channel analyzer 94 is biased to receive selectively electrical pulses within a first energy range from 1.30 to 2.92 MeV. The second single channel analyzer 96 is biased to receive selectively electrical pulses with a second energy range from 3.43 to 10 MeV. By biasing the analyzers 94 and 96 to separate and distinct energy bands, two signals which are energy dependent are formed.

The outputs of the single channel analyzers 95 and 96 are in turn applied to autocorrelators 99 and 100 respectively. The autocorrelator 99 produces across its output leads 103 a signal representing autocorrelation of the signal derived from the single channel analyzer 95. Similarly the autocorrelator 100 produces across its output leads 106 a signal representing autocorrelation of the signal derived from the single channel analyzer 96.

The signals produced by the autocorrelators 99 and 100 are transmitted by the cable 20 to the earth's surface and then through amplifiers 115 and 116 respectively to processing elements 117 and 118 respectively. The processing elements 117 and 118 are of a construction similar to that of the processing element 65 in FIG. 3. The output signal derived from the processing element 117 is recorded as a trace 121 in the recorder 120 whereas the output signal derived from the processing element 118 is recorded as a trace 122 in the recorder 120. The recorder 120 may be a conventional two-trace recorder, the chart of which is driven in correlation with depth by a measuring reel 123 and connector 124.

Thermal neutrons produced around the housing 90 by high energy neutrons emitted by the source 25 are absorbed by constituent nuclei in the environment adjacent to the housing in accordance with the relative thermal neutron capture cross sections of nuclei of various elements present in the environment. Because of neutron capture, gamma rays are emitted having energies which are characteristic for these elements. Gamma radiations resulting from capture of thermal neutrons in the first energy range, from 1.30 to 2.92 MeV include a significant part of the capture of gamma ray spectrum of hydrogen whereas gamma radiations resulting from capture of thermal neutrons in the second energy range, from 3.43 to 10 MeV, include a significant part of the thermal neutron capture gamma ray spectrum of chlorine. Gamma radiations within both energy ranges are detected by the detector 29. One obtains at the output of the detector 29 electrical pulses having magnitudes which represent energies of individual gamma rays. Pulses in the first energy range transmitted selectively by the single channel analyzer 95 represent gamma rays of capture due to the presence of hydrogen in the environment adjacent to the housing 90. Pulses in the second energy range transmitted selectively by the single channel analyzer 96 represent gamma rays of capture due to the presence of chlorine in the environment admacent to the housing 90. Accordingly by biasing the single channel analyzers 95 and 96 to separate and distinct energy bands, two signals which represent relative contents of hydrogen and chlorine are formed.

Let $y_1(t)$ be the signal obtained from the single channel analyzer 95 and $y_2(t)$ be the signal obtained from the single channel analyzer 96. The signal $y_1(t)$ applied to the autocorrelator 99 is transformed by the autocorrelator into an output signal at the terminal 103 which represents the autocorrelation function $$R_{y_1y_1}(\tau) = \overline{y_1(t)y_1(t+\tau)} = \lim_{T\to\infty} \frac{1}{2T} \int_{-T}^{T} y(t)y(t+\tau)dt. \tag{36}$$

Similarly the signal $y_2(t)$ applied to the autocorrelator 100 is transformed by the autocorrelator into an output signal at the terminal 106 which represents the autocorrelation function $$R_{y_2y_2}(\tau) = \overline{y_2(t)y_2(t+\tau)} = \lim_{T\to\infty} \frac{1}{2T} \int_{-T}^{T} y_2(t)y_2(t+\tau)dt. \tag{37}$$

Let $h_1(t)$ be the impulse response function which comprises frequencies within the range from 1.30 to 2.92 MeV which are transmitted by the single channel analyzer 95 and let $h_2(t)$ be the impulse response function which comprises frequencies within the range from 3.43 to 10 MeV which are transmitted by the single channel analyzer 96. Using the function $h_1(t)$, I form a relationship similar to that given by the equation (10). It is $$R_{y_1y_1}(\tau) = \int_{-\infty}^{\infty} R_{h_1h_1}(\lambda)R_{xx}(\tau-\lambda)d\lambda \tag{38}$$

where $$R_{h_1h_1}(\lambda) = \overline{h_1(t)h_1(t+\lambda)} = \lim_{T\to\infty} \frac{1}{2T} \int_{-T}^{T} h_1(t)h_1(t+\lambda)dt \tag{39}$$

and $R_{xx}$ is as defined by equation (6). I assume that $x(t)$ is white noise or a random or pseudorandom function which approximates white noise. In such case equation (38) becomes $$R_{y_1y_1}(\tau) = N_1 R_{h_1h_1}(\tau) \tag{40}$$

where $N_1$ is a constant.

For a system in which impulse response function $h_1(t)$ is of the form $$h_1(t) = C_1 e^{-\alpha_1 t} \tag{41}$$

where $C_1$ and $\alpha_1$ are constants, equation (40) becomes $$R_{y_1y_1}(t) = \frac{N_1 C_1^2}{2\alpha_1} e^{-\alpha_1 t}. \tag{42}$$

Similarly for a system in which the impulse response function $h_2(t)$ is of the form $$h_2(t) = C_2 e^{-\alpha_2 t} \tag{43}$$

where $C_2$ and $\alpha_2$ are constants, one obtains $$R_{y_2y_2}(t) = \frac{N_2 C_2^2}{2\alpha_2} e^{-\alpha_2 t} \tag{44}$$

where $N_2$ is a constant.

The relationship of equation (42) shows that the function $R_{y_1y_1}(t)$ which is the autocorrelation function obtained from the output terminals of the autocorrelator 99 represents the impulse response function $h_1(t)$. Similarly, the function $R_{y_2y_2}(t)$ obtained from the output terminals of the autocorrelator 100 represents the impulse response functions $h_2(t)$.

The decay constants $\alpha_1$ and $\alpha_2$ which appear in equations (41) and (43), respectively, can be expressed as $\alpha_1 = v\Sigma_H$ and $\alpha_2 = v\Sigma_{Cl}$, where $v = 2.2 \times 10^5$ cm/sec is the velocity of thermal neutrons, $\Sigma_H$ is the macroscopic cross section for capture of thermal neutrons by hydrogen whereas $\Sigma_{Cl}$ is the macroscopic cross section for capture of thermal neutrons by chlorine. Consequently the decay constants $\alpha_1$ and $\alpha_2$ represent respectively the amounts of hydrogen and of chlorine in the environment adjacent to the housing 90.

The signals derived from the correlators 99 and 100 representing the functions $h_1(t)$ and $h_2(t)$, respectively, are transmitted to the earth's surface and are applied to the processing circuits 117 and 118, respectively. The processing circuit 117 contains appropriate circuitry and computing means to produce across its output lead a signal representing $\alpha_1$ which is recorded as a function of depth of the bore hole in the form of a graph 121. Similarly, the processing circuit 118 produces across its output leads a signal representing $\alpha_2$ which is recorded as a function of depth in the form of a graph 122.

It should be noted that the embodiment of FIG. 8 can be modified by replacing the autocorrelators 99 and 100 by crosscorrelators and using crosscorrelation rather than autocorrelation in order to obtain the impulse response functions similar to the functions $h_1(t)$ and $h_2(t)$ as expressed by the equations (41) and (43), respectively. A crosscorrelator that would replace the autocorrelator 99 would have one of its input terminals connected to the single channel analyzer 95 and the other input terminal connected to the control element 27 and would produce at its output terminals a function $R_{xy1}(t)$ which is the crosscorrelation of the function $x(t)$ obtained from the control element 27 and representing the energy pulses from the source 25 and of the function $y_1(t)$ obtained from the single channel analyzer 95. Then, by using arguments similar to those based on the derivation of the equation (9), I obtain $R_{xy1}(t) = C_3 e^{-\alpha_1 t}$ where $C_3$ is a constant, This function is similar to the function $h_1(t)$ expressed by the equation (41). A crosscorrelator that would replace the autocorrelator 100 would have one of its input terminals connected to the signal channel analyzer 96 and the other input terminal connected to the control element 27 and would produce at its output terminals a function $R_{xy2}(t)$ which is the crosscorrelation of the function $x(t)$ obtained from the control element 27 and of the function $y_2(t)$ obtained from the single channel analzyer 96. The crosscorrelation can be expressed as $R_{xy2}(t) = C_4 e^{-\alpha_2 t}$ where $C_4$ is a constant. This function is similar to the function $h_2(t)$ expressed by the equation (43). The two signals representing the functions $R_{xy1}(t)$ and $R_{xy2}(t)$ are then transmitted by means of the cable 20 and are processed for recording as explained above in connection with FIG. 8.

It is of some importance to determine in advance the lengths of time intervals which are involved in correlation analysis. Let the time of measurement T be divided into equal time intervals $\Delta t$. The instants of time separated by $\Delta t$ will be $t_0, t_1, t_2 \ldots t_n$ such that $t_{i+1} - t_i = \Delta t$. Let the value of $x(t)$ and $y(t)$ at times $t_i$ be $x_i$ and $y_i$ respectively and let $\tau = k\Delta t$. Then $R_{xy}(\tau)$ can be expressed as $$R_{xy}(\tau) = \frac{1}{n-k} \sum_{i=1}^{n-k} x_i y_{i+k} - \frac{1}{n^2} \sum_{i=1}^{n} x_i \sum_{i=1}^{n} y_i \quad (45)$$

and $R_{yy}(\tau)$ can be written as $$R_{yy}(\tau) = \frac{1}{n-k} \sum_{i=1}^{n-k} y_i y_{i+k} - \frac{1}{n^2} \left( \sum_{i=1}^{n} y_i \right)^2. \quad (46)$$

The magnitude of $\Delta t$ determines the resolution in the measurement of the impulse response function $h(t)$. If $\Delta t$ is small the resolution is relatively large. By properly choosing the time constant of the detector 29, the time interval $\Delta t$ may have a value which is appropriate to the type of measurement to be performed. Thus, if the quantity to be observed is the mean life of thermal neutrons, one should have $\Delta t \sim 1/v\Sigma_a$ where v is the velocity of thermal neutrons and $\Sigma_a$ the macroscopis capture cross section of the formation for thermal neutrons. If one desires to measure radiations resulting from inelastic scatterings of fast neutrons emitted by the source 25 with nuclei of the constituent elements in the formation 16, then $\Delta t$ should be of the order of 5 microseconds.

The method and apparatus according to my invention may be applied in exploration for uranium, and, particularly in delayed fission uranium logging referred to herein above. In such case, as shown in the above referred to U.S. Pat. No. 3,686,503 issued to W. W. Givens, et al., the source 25 in FIG. 1 should preferably be of the deuterium-tritium type and the detector 29 should preferably be a thermal neutron detector as described herein above. Since the most abundant delayed fission neutron group exhibits the half life of about 2.3 seconds, $\Delta t$ should have a value of the same order of magnitude, preferably between 1 second and 10 seconds or between 2 seconds and 5 seconds.

It can be understood by those skilled in the art that correlation techniques may also be used when the excitation of the radiation source is sinusoidal. A better signal to noise ratio is then obtained. To accomplish this objective, I provide a control element (analogous to the control element 27 in FIG. 1) for generating a sinusoidal function $$x(t) = L \cos(\omega t + \theta) \quad (47)$$

where L and $\theta$ are constants, and consequently I vary the intensity of the neutron generator (such as the neutron generator 25 in FIG. 1) sinusoidally in accordance with the expression of the equation (47). Then, by crosscorrelating the signal derived from the control element with the signal derived from the output of a gamma ray detector, I obtain a crosscorrelation signal $$R_{xy}(\tau) = \left( \frac{L^2}{2} \right) \int_{-\infty}^{\infty} h(u) \cos \omega(\tau - u) du. \quad (48)$$

The signal expressed by equation (48) represents the response of the system to a neutron flux varying as a cosine of amplitude $L^2/2$ and frequency $\omega$. Thus a complete plot of the impulse response function $h(t)$ in frequency domain can be obtained by repeating the measurement at many different frequencies. The results are therefore equivalent in a sense to a standard frequency response measurement with the added feature that any noise present in the output is suppressed. The crosscorrelation process serves here essentially as a narrow band filter centered at a frequency $\omega$ which extracts the output $y(t)$ from the extraneous noise.

Figure 9:
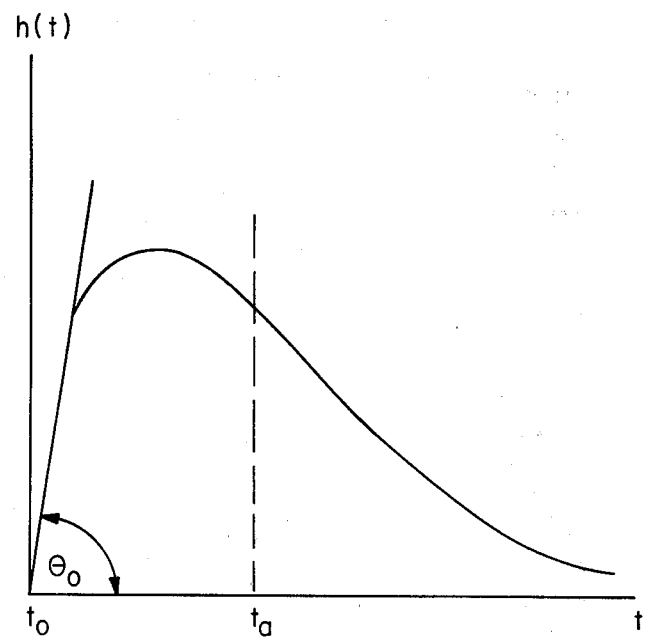
FIG. 9 is a graph showing the response of a formation to a suddenly applied neutron pulse.

It should be noted that the impulse response function $h(t)$ can be naturally divided in two time zones as shown in the graph of FIG. 9. In the first time zone from an initial instant $t_0$ to an instant $t_a$ the function $h(t)$ rapidly rises. In this zone the slowing down of fast neutrons plays the dominant part. In the second zone for values of time larger than $t_a$, the function $h(t)$ slowly decays. In the latter zone the capture of thermal neutrons plays the dominant part.

In the prior art attention was primarily directed to the decaying portion of the graph in FIG. 9. Thus by examining the decay of the function $h(t)$, as obtained by means of the arrangement of FIG. 1 or FIG. 2, various schemes for determining the lifetime of thermal neutrons have been devised. However, it should be pointed out that the rising portion of the curve contains information revealing significant properties of the formation 16.

Consider the rising portion of the curve in FIG. 9. It is seen that at the initial instants the density of the thermal neutron cloud is relatively small. However as time increases, the density increases and the rate of increase depends upon the ability of the formation to slow down the fast neutrons which eventually reach the thermal level. Consequently, the rate of increase of the rising portion obtained graphically in FIG. 9 as tan $\theta_0$ is indicative of the rapidity of fast neutrons to reach thermal level, i.e., it represents the time between a neutron being produced by the generator 25 as a 14 MeV neutron and it becomming a thermal neutron. It is well known that hydrogen because of its low atomic mass is very effective in slowing down fast neutrons. Consequently in a hydrogeneous formation the curve as in FIG. 9 rises much faster than in a formation containing less hydrogen and in such case tan $\theta_0$ is relatively large. Thus a large value of tan $\theta_0$ indicates a large amount of hydrogen and, conversely, a small value of tan $\theta_0$ indicates a small amount of hydrogen. It is thus seen that the initial portion of the impulse response function h(t) can be used to determine the relative amount of hydrogen in the formation 16.

Figure 10:
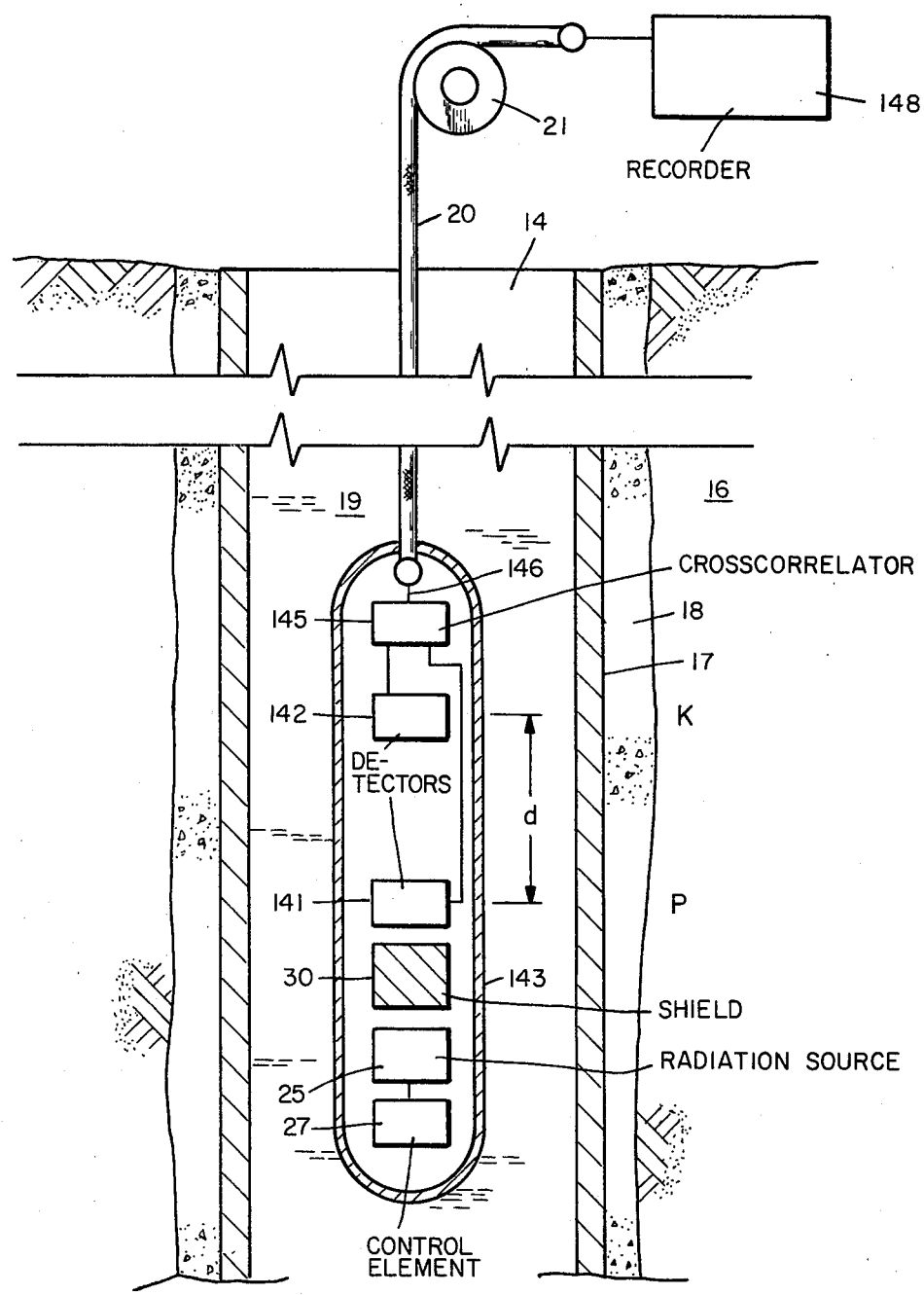
FIG. 10 is a drawing showing a well logging system comprising two detectors longitudinally spaced from the pulse generator and a means for crosscorrelating the outputs of the detectors in accordance with my invention.

Consider now FIG. 10 which shows an embodiment of my invention involving spatial correlation. In such case the outputs of two detectors positioned at different locations in a bore hole are crosscorrelated. Some of the elements of FIG. 10 are similar to those which have been previously described. These elements have the same reference numerals as the corresponding elements in previous figures and their descriptions and functions will not be restated. Specifically, in FIG. 10 two detectors, 141 and 142, are provided for detecting radiations resulting from the interactions of substances adjacent to the housing 143 with radiations emitted by the source. The outputs of the detectors 141 and 142 are applied to a crosscorrelator 146 and the signal derived from the crosscorrelator is in turn applied to a recorder 148. The bore hole may be dry or may be filled with drilling mud as shown. It should be clearly understood that the casing 17 may not always be present and in such case the walls of the bore hole are coated with a mud cake.

To reduce the influence of the mud 19 a decentralizing mechanism (not shown in the figure) may be provided. A decentralizing mechanism comprises a resiliently activated arm which is pivotally attached to the housing and urges the opposite side of the housing against the bore hole wall to prevent the mud from intervening between housing and formation.

Figure 11:
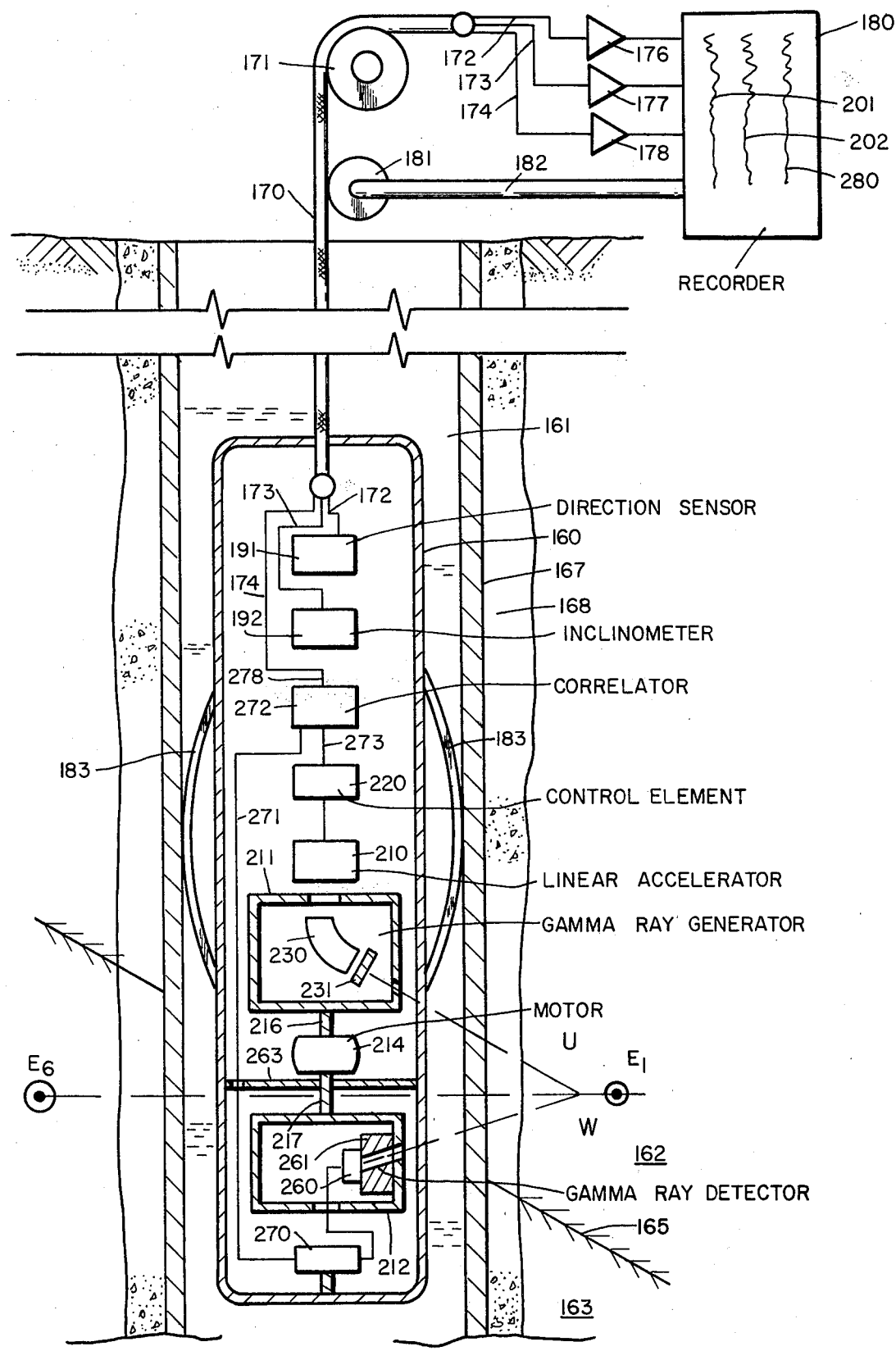
FIG. 11 is a drawing showing an embodiment of my invention which comprises a source of gamma radiations.

The housing may also be provided on its side in contact with the wall with a pad which is urged against the wall by resiliently actuated arms so as to follow as well as possible all the irregularities of the wall. Such a decentralizing mechanism and pad may be of the type shown in FIG. 1 of U.S. Pat. No. 4,048,495 issued to D. V. Ellis on Sept. 13, 1977. In other instances a decentralizing mechanism may be replaced by a centering device for maintaining the housing in an essentially centered position within the bore hole. Such a centering device may be of the type shown in FIG. 11 of this specification. Referring now specifically to FIG. 11, the centering device shown therein consists of spring elements 183 which contact the sides of the bore hole.

The source of radiant energy shown in FIG. 10 may be a source of neutrons or a source of gamma rays. As a neutron source, I may employ a sealed tube neutron source 25 and a control element 27. The control element 27 is adapted to control the source to produce a substantially random or pseudorandom sequence of discrete bursts of neutrons.

In some instances an isotopic neutron source such as a polonium-beryllium source is employed. Then in FIG. 10 the generator 25 and the control element 27 should be replaced by such an isotopic neutron source. In other instances a gamma ray source such as cesium 137 or any other conventional gamma ray source may be used. In such case the generator 25 and the control element 27 should be replaced by a gamma ray source.

The detectors 141 and 142 are vertically spaced from the radiation source. The spacing of the detector 142 from the radiation source is larger than the spacing of the detector 141 from said source. The type of the detectors depends upon the nature of the radiations emitted by the source. If the source is a neutron source then the detectors 141 and 142 may be either gamma ray detectors or neutron detectors. If a gamma ray source is employed the detectors 141 and 142 are gamma ray detectors.

Consider now the arrangement of FIG. 10 in which the radiation source is a gamma ray source and the detectors are gamma ray detectors. Our objective in this case is to measure density of earth formation surrounding the bore hole by taking into account the effect of the mudcake on the bore hole wall. It is well known in the art that as the mudcake is traversed by the gamma rays, the formation density derived from the usual rate of these gamma rays is strongly affected by the mudcake density which is generally different from the formation density.

To obtain correct density measurement the two detectors in FIG. 10 are spaced at different distances from the source. The near or short spaced detector 141 receives gamma rays which have been influenced mainly by the materials near the bore hole and therefore in the mudcake. The far, or long spaced, detector 142 receives gamma rays which have diffused principally in the formation. The detectors 141 and 142 are longitudinally spaced from the radiation source and spaced one from another by an appropriate distance d. Let $z_1(t)$ be the signal at the output of the detector 141 and $z_2(t)$ be the signal at the output of the detector 142. These two signals are applied to a crosscorrelator 145. One obtains at the output terminals 146 of the crosscorrelator 145 a signal representing the crosscorrelation of $z_1(t)$ and $z_2(t)$ which is $$R_{z_1z_2}(\tau) = \lim_{T \to \infty} \frac{1}{2T} \int_{-T}^{T} z_1(t)z_2(t + \tau)dt. \tag{49}$$

The above signal is transmitted by the cable 20 to the earth's surface and recorded in recorder 148. Thus by examining the crosscorrelation function of the outputs of the detectors 141 and 142 an indication of the density of the formation compensated for the effects of the mudcake is obtained.

Consider now another embodiment of my invention in which the radiation source is a source of neutrons and the detectors 141 and 142 are neutron detectors or gamma ray detectors. It should then be noted that the concentration of the neutron population in the region P around the detector 141 is not the same as the concentration of the neutron population in the region K around the detector 142. Thus the output of the detector 141 is different from that of the detector 142. The difference exists because the rate at which neutrons diffuse away from (or towards) a given region depends on the gradient of the population in the region, which in turn is a function of the spacing of the detector from the source. The substantial departure from agreement of the observed values in the region P and in the region K indicates that the influence of perturbational effects due to diffusion and other effects may be significant.

It is, therefore our objective to take into account the influence of diffusion on neutron absorption characteristic measurements and to obtain a corrected value indicating an accurate measurement of the intrinsic formation characteristic. Such a corrected value is obtained by crosscorrelating the outputs of the detectors 141 and 142 by means of the crosscorrelator 145. The signal derived from the crosscorrelator is indicated on the recorder 148.

The principles of my invention will now be applied to acoustical logging. Basically, acoustical logging employs a downhole housing which contains a transmitter of acoustical signals and a receiver for detecting these signals after they have travelled through the environment adjacent to the housing. Knowing the distance between the transmitter and the receiver, the velocity of acoustical signals through the environment adjacent to the sonde may be determined by measuring the time of travel between the transmitter and the receiver. The impulse response function h(t) obtained in acoustical logging will show the sequence of various acoustic signals arriving at the detector. By examining the record of the function h(t), physical properties of formations surrounding a bore hole and/or of the fluid within the bore hole may be determined.

The system of acoustic logging according to my invention can be examined in connection with FIG. 1 or FIG. 2. The source 25 is represented by an acoustic generator adapted to emit short acoustic pulses in the ultrasonic frequency range and the detector 29 is an electroacoustic detector. The acoustic pulses are emitted by the generator 25 directionally toward the formation. The generator and the detector have frequency response in the range preferably between 1 kHz and 1 MHz. The generator 25 is controlled by a control element 27 so as to inject into the formation successive bursts of acoustic energy. These bursts succeed each other at a random or pseudorandom sequence. As shown in FIG. 1 a crosscorrelator 26 is provided which produces across its output terminals a signal derived from the control element 27 and the signal derived from the detector 29. The output of the crosscorrelator 36 represents the impulse response function h(t) as obtained in accordance with the equation (9). Similarly, as shown in FIG. 2 the signal derived from the autocorrelator 60 represents the impulse response function h(t) as obtained in accordance with the equation (13).

The output of the autocorrelator 60 as in FIG. 2 is transmitted to the earth's surface by the cable 20. The surface equipment comprises a recorder 55 which is driven in correlation with depth.

I have shown above, as an example, two applications of my invention: in neutron logging and in acoustic logging. Obviously other forms of well logging can be used. Thus the generator 25 can generate pulses of microwave energy—or pulses of photons or gamma rays.

The term "photon" or "gamma ray" is used here interchangeably to mean high frequency electromagnetic radiations, regardless how they originate and are meant to include gamma rays, X-rays and bremstrahlung, each of which consists of high frequency electromagnetic radiation but are classified, in general, by the way in which they originate.

FIG. 11 is a drawing showing a representational view in longitudinal section of an embodiment comprising a source of photons or gamma rays. The particular embodiment which I have chosen is adapted to the measurement of orientation of the strata adjacent to the bore hole.

The orientation of a stratum is ordinarily indicated by angles of "dip" and the direction of "strike." The angle of dip is defined to be the angle of inclination of the bedding plane with a horizontal plane, while the direction of strike is defined to be the direction of the line of intersection of the bedding plane and a horizontal plane. Having obtained the dip and the strike of a particular stratum, the exact orientation of the stratum has been established. This information is useful in predicting the possibility of obtaining oil in the bore hole tested, in establishing the general geologic nature of the adjacent earth, and for the indication of possible nearby oil deposits.

Referring now specifically to FIG. 11, the instrument shown therein includes a fluid tight housing 160 adapted to be suspended in a bore hole 161 that traverses earth formations 162 and 163. These formations are separated by an interface 165 which is shown to be inclined with respect to the horizontal plane. The bore hole may be either cased, as represented by casing 167 and cement annulus 168, or uncased, and it may be filled with drilling mud or other fluid. A logging cable 170 passing over a sheave wheel 171 is used to support the housing 160 within the bore hole. The cable 170 has conductors for transmitting electrical signals from the housing to the earth's surface. The conductors 172, 173 and 174 are used to transmit signals at the surface of the earth through amplifiers 176, 177 and 178, respectively, to a recorder 180. The recorder is driven in correlation with depth of the housing by a measuring wheel 181 and connector 182.

A centering device is provided for the housing 160 to maintain the housing in an essentially central position in the bore hole. This is accomplished by virtue of the spring elements 183 which contact the sides of the bore hole. While the drawing simply illustrates two spring elements 183, it is preferred to use four spring elements for this purpose. These spring elements 183 perform the dual function of maintaining the housing in a central position within the bore hole and of minimizing rotation of the housing as it is lowered down the bore hole.

While the centering device minimizes rotation of the housing 160, nevertheless, torsional forces due to the unrolling of the supporting cable 170 at the surface of the earth and other effects do cause rotation of the housing thus changing the orientation of the housing relative to the magnetic north. The change in orientation of the housing should be taken into account in the measurement of the strike and dip. Furthermore account should be taken of the inclination of the axis of the housing 160, since there is probably no way of practically maintaining suitable apparatus in a truly vertical position. Thus in the embodiment described, as the housing 160 is aligned with the bore hole, any departure of the bore hole from vertical will incline the apparatus.

As bore holes are often non-vertical, it is apparent that a suitable inclinometer is a critical part of this arrangement.

Accordingly, located in the upper portion of the housing 160 is a direction sensing unit, or compass 191 and an inclinometer 192. The direction sensing unit operates to provide an output signal representative of the orientation of the housing 160 relative to the magnetic north. This output signal is transmitted to the surface of a conductor 172 within the cable 170, is subsequently amplified by means of the amplifier 176 and applied to the recorder 180. The recorder comprises a chart in which the trace 201 shows the signal derived from the direction sensing unit in correlation with depth. The inclinometer 192 operates to provide an output signal which is transmitted to the surface on a conductor 173 within the cable 170 and subsequently amplified by means of the amplifier 177 and applied to the recorder 180. The trace 202 on the chart of the recorder 180 shows the output of the inclinometer in correlation with depth.

Located in the lower portion of the housing 160 is an instrumental means for transmitting photons or gamma rays directionally into the formations and directionally receiving photons or gamma rays scattered by the formations. This means includes a linear accelerator 210, two tubular members 211 and 212 having their axes aligned along the axis of the housing, an electric motor 214 which drives the tubular members 211 and 212 at a constant rotational speed. Located within the tubular member 211 is a gamma ray generating means for transmitting gamma rays into the formations. Located within the tubular member 212 is a gamma ray detecting means for detecting gamma rays scattered by the formations. A control element 220 is provided within the housing 160 to control the linear accelerator 210 to produce bursts of high energy electrons whereby said bursts succeed each other at a substantially random or pseudorandom sequence. The control element 220 is of a type similar to the control element 27 in FIG. 1. The linear accelerator 210 is of a type similar to that described in the U.S. Pat. No. 3,976,879 issued to R. E. Turcotte on Aug. 24, 1976. This patent is specifically incorporated in this specification as a reference.

The accelerator 210 contains an electron source and an accelerating means comprising a grid controlled electroemissive cathode that supplies relatively short bursts of electrons to a number of substantially identical accelerating cavities that are successively arranged along the axis of the linear accelerator. The linear accelerator is excited with microwave energy from a magnetron which operates in a frequency range covering the resonant frequency of the accelerating cavity and sets up a standing wave in the cavity for accelerating the electrons.

The gamma ray generating means within the tubular member 211 is also of the type described in the above referred to U.S. Pat. No. 3,976,879 issued to Turcotte. It contains a deflecting magnet 230 and a target 231 which are fixedly mounted in the tubular member 211 and arranged to be rotated together with the tubular member 211 by the shaft 216 and the motor 214. Bursts of high energy electrons produced by the accelerator 210 are deflected by the magnet 230 to strike the target 231 to produce bursts of high intensity photons which are transmitted into the formation of a direction aligned along the path U.

Figure 12:
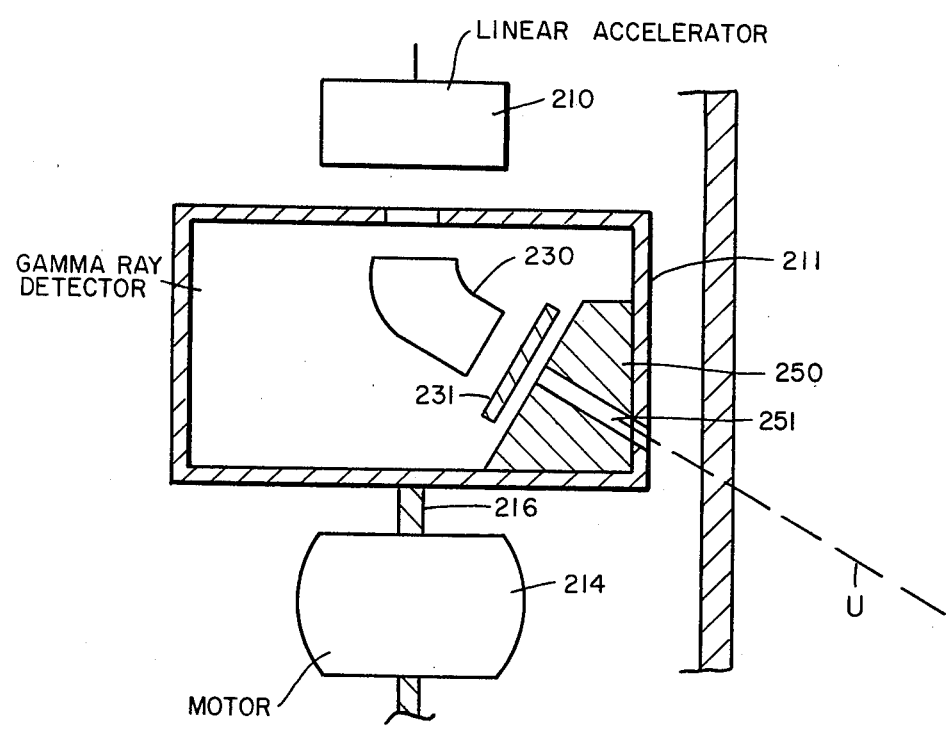
FIG. 12 is a drawing showing a modified version of a directional gamma ray source which is a part of the arrangement of FIG. 11.

The directivity of the transmitted photon beam can be further enhanced as shown in a modified version of gamma ray generating means of FIG. 12. Adjacently to the target 231 there is a collimator 250 provided with a passageway 251 along the direction of the path U.

Within the photon detecting means there is a detector 260 for detecting gamma rays and a collimator 261. The collimator 261 is provided with a passageway or a collimator hole which acts as a path for directionally detecting scattered gamma rays which are aligned substantially along the path indicated as path W.

The collimators 250 and 261 are fabricated of a material that is essentially opaque to gamma radiations and may comprise any of the materials known to be effective in attenuating gamma radiations, such as lead, bismuth, tungsten alloy and the like. Both the detector 260 and the collimator 261 are fixedly mounted within the tubular member 212 and are arranged to be rotated together with the tubular member 212 by the shaft 217 and the motor 214. The detector 260 may be for instance a semiconductor detector or a scintillation crystal and photomultiplier detector as described herein above.

A shield 263 is interposed between the gamma ray generating means and the gamma ray detector 260. The shield may be fabricated of any material appropriate to prevent unacceptable levels of gamma radiations from reaching the detector.

The effective volume element for scattering interactions sensed by the detector 260 is a volume element containing a point $E_1$ which is a point of intersection of the lines U and V. This volume element, hereafter defined as the scattering volume element (SVE) is remote from the bore hole and is located in the virgin formations at a convenient lateral distance from the casing 167 and the cement 168.

It is well understood by those skilled in the art that the probability that a gamma ray will be scattered from a particular zone or volume element of an earth formation is proportional to the number of electrons in such a zone or volume element. In this case the response of the detector 260 is related to the density of the substance within the scattering volume element (SVE).

The signal from the output of the detector 260 is applied through slip rings 270 and lead 271 to the input terminal of a correlator 272. The correlator may be a crosscorrelator as the crosscorrelator 36 in FIG. 1 or it may be an autocorrelator as the autocorrelator 60 in FIG. 2. If used as a crosscorrelator than an additional lead such as lead 273 is provided to connect the correlator to the control element 220. Then one obtains at the output terminals 278 of the correlator a crosscorrelation of two signals. One of these represents the output of the detector 270 whereas the other represents the random or pseudorandom sequence electron pulses obtained from the linear accelerator 210. If the correlator 272 is used as an autocorrelator then the lead 273 is eliminated and one obtains at the output terminal 278 of the correlator 272 an autocorrelation of the signal derived from the detector 260.

It is well understood by those skilled in the art that the signal at the output terminal of the correlator 279 represents density of the substance within the scattering volume element (SVE). This signal is transmitted by means of the lead 174 within the cable 170 to the earth's surface and then applied through the amplifier 178 to the recorder 180. One thus obtains on the chart of the recorder a trace 280 representing the density of the scattering volume element (SVE).

It should be noted that the output terminals of the detector 260 could be connected directly to the lead 174 and if this is done, then the signal derived from the detector 260 would be transmitted directly by the cable 170 to the recorder 280. In such a case the correlator would not be employed. However the usefulness of the correlator is in obtaining a better signal to noise ratio than that which would have been obtained without the use of the correlator.

Appropriate power supplies (not shown) should be provided at the surface and in the instrument for delivering the required power to the various uphole and downhole components of the logging device.

Consider now the housing 160 positioned adjacently to the formations 112 and 113 as shown in FIG. 11. The electric motor 214 is arranged to rotate at a constant rotational speed the cylindrical member 211 together with the gamma ray emitter contained therein and the cylindrical member 212 together with the gamma ray detector contained therein. The effects of rotation are shown schematically in an idealized diagram of FIG. 13.

Figure 13:
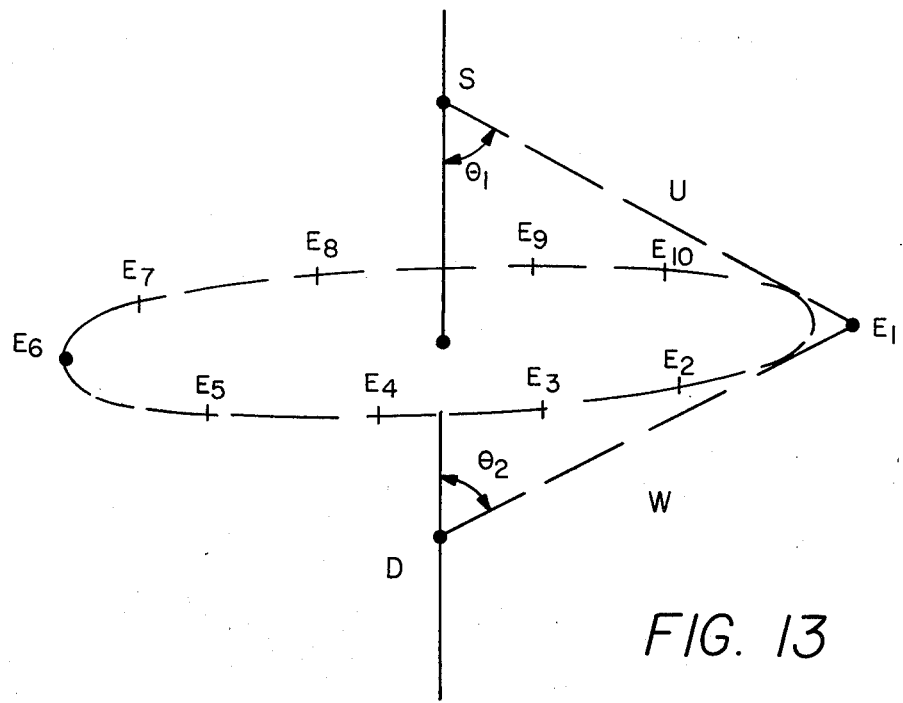
FIG. 13 is a drawing showing an idealized and schematic representation of various paths of transmitted and scattered gamma rays. It may assist in explaining the principles of operation of the embodiment of FIG. 11.

FIG. 13 shows a radiation source S emitting gamma rays along a path U which is inclined at an angle $\theta_1$ with respect to SD which is the axis of the bore hole. In FIG. 11 the radiation source is at the position of the target 231. During rotation of the tubular member 211, the line which defines the path U rotates around the axis SD while maintaining constant the angle $\theta_1$ with respect to the axis. The point D in FIG. 13 represents the radiation detector which is the detector 260 of FIG. 11 and the path W defines the travel of gamma rays intercepted by the detector. The path W is inclined with respect to the axis SD by an angle $\theta_2$. During rotation the path W rotates around the axis while maintaining constant the angle of inclination $\theta_2$ with respect to the axis. The point of intersection of the paths U and W which define the scattering volume element (SVE) rotates along a circumference of a circle shown in FIG. 13 and successively occupies positions marked $E_1, E_2 \ldots E_6, E_7 \ldots E_{10}$. At the position $E_1$ which corresponds to the orientation of the housing 160 in FIG. 11, the scattering volume element (SVE) is located within the formation 162 and at the output of the detector 260 a signal representing the density of the formation 162 is obtained. Because of the inclination of the interface 165 the scattering volume element (SVE) is contained partly in the formation 162 and partly in the formation 163 during a complete cycle of rotation. During the portion of the cycle when the scattering volume element (SVE) is within the formation 162 the detector produces a signal representing the density of said formation, whereas during the remaining portion of the cycle the detector produces a signal which represents the density of the formation 163.

Summarizing the above it can be seen that in the recorder 180 three curves denoted as curves 201, 202 and 280 are obtained. The curve 201 provides a signal derived from the amplifier 176 and it represents the orientation of the housing 160 with respect to the magnetic north. The curve 202 provides a signal derived from the amplifier 177 which represents the inclination of the housing 160 with respect to the vertical. The curve 280 provides a signal derived from the amplifier 178 which represents the output of the correlator 272.

By observing these curves it is possible to calculate by simple trigonometry both the dip and the strike of the formations 162 and 163.

I have thus provided a method and apparatus for obtaining the dip and strike of strata adjacent to the bore hole. The procedure entails lowering a properly centered and aligned measuring device down a bore hole, having means for obtaining records of three parameters and obtaining the dip and the strike from these parameters.

It should be noted that in some instances a distinction is made between the crosscorrelation function $R_{xy}$ (see equation 5) and the crosscovariance function $C_{xy}$ which is defined as $$C_{xy} = R_{xy} - E(x) \cdot E(y) \tag{50}$$

where E designates the estimated (mean) value of x or of y. Similarly the autocorrelation function $R_{xx}$ (see equation (6) and the autocovariance function $C_{xx}$ are related by $$C_{xx} = R_{xx} - E(x) \cdot E(x). \tag{51}$$

Therefore in some instances a crosscorrelator, when used in this specification may be a crosscovariance meter. Similarly an autocorrelator when used in this specification may be an autocovariance meter.

While there have been described what I consider at present to be preferred embodiments of this invention, it will be obvious for those skilled in the art that various changes and modifications may be made therein without departing from the invention, and I, therefore, intend to cover all such changes and modifications as they fall within the true spirit and scope of my invention.

What I claim is:

1. A method of making measurements in a bore hole traversing subterranean formations that comprises:
   (a) generating discrete bursts of radiant energy in the neighborhood of said formations whereby said bursts interact with substances traversed by said bore hole,
   (b) detecting radiations resulting from said interactions,
   (c) developing an impulse response function characterizing said substances, said function increasing with time at a relatively rapid rate and then decreasing at a relatively slower rate, and
   (d) determining the amount of increase of said impulse response function with respect to time.

2. A method of determining the inclination of a formation with respect to a vertical axis of a borehole by means of a high intensity photon source pulsed to emit repetitive bursts of photons, said method comprising the steps of:
   (a) obtaining a plurality of indications of photons returning to the bore hole as a result of the interactions of the emitted photons with the surrounding media, said indications being obtained in the neighborhood of the walls of the bore hole at various azimuthal positions within a plane perpendicular to the axis of the bore hole,
   (b) producing signals representing said indications, and
   (c) deriving from said signals a measurement of the inclination of said formation.

* * * * *